(12) United States Patent
Zhang

(10) Patent No.: US 12,456,040 B2
(45) Date of Patent: Oct. 28, 2025

(54) COMPUTE IN MEMORY THREE-DIMENSIONAL NON-VOLATILE NAND MEMORY FOR NEURAL NETWORKS WITH WEIGHT AND INPUT LEVEL EXPANSIONS

(71) Applicant: Sandisk Technologies, Inc., Milpitas, CA (US)

(72) Inventor: Yanli Zhang, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 1102 days.

(21) Appl. No.: 17/343,240

(22) Filed: Jun. 9, 2021

(65) Prior Publication Data
US 2022/0398439 A1    Dec. 15, 2022

(51) Int. Cl.
*G11C 11/54*    (2006.01)
*G06F 7/523*    (2006.01)
(Continued)

(52) U.S. Cl.
CPC .............. *G06N 3/063* (2013.01); *G06F 7/523* (2013.01); *G06N 3/04* (2013.01); *G06N 3/08* (2013.01); *G11C 11/54* (2013.01); *G11C 11/5628* (2013.01); *G11C 11/5642* (2013.01); *G11C 11/5671* (2013.01); *G11C 16/0483* (2013.01); *G11C 16/10* (2013.01); *G11C 16/26* (2013.01); *H01L 25/18* (2013.01)

(58) Field of Classification Search
CPC ........ G06F 7/523; G06N 3/08; G06N 3/0464; G06N 3/0475; G11C 11/54; G11C 16/0483; G11C 16/10; G11C 16/26
See application file for complete search history.

(56) References Cited

U.S. PATENT DOCUMENTS 6,147,550 A    11/2000    Holloway
9,430,735 B1    8/2016    Vali et al.
(Continued)

OTHER PUBLICATIONS

Fick, L., et al., "Analog In-Memory Subthreshold Deep Neural Network Accelerator," IEEE Custom Integrated Circuits Conference (CICC), Apr.-May 2007, 4 pages.
(Continued)

*Primary Examiner* — Mushfique Siddique
(74) *Attorney, Agent, or Firm* — Pearl Cohen Zedek Latzer Baratz LLP

(57) ABSTRACT

A non-volatile memory device for performing compute in memory operations for a neural network uses a three dimensional NAND architecture. Multi-bit weight values are stored encoded as sets of threshold voltages for sets of memory cells. A weight value is stored in multiple memory cells on the same word line and connected between a bit line and a source line, each of the memory cells programmed to one of multiple threshold voltages. When multiplying an input value with the weight value, the word line is biased so that, for at least one of the threshold voltages, the memory cell will be in the linear operation region. Input values are encoded as a set of one or more voltage levels applied to a corresponding set of bit lines, each bit line connected memory cells also storing the weight value, connected to the word line, and connected to the source line.

20 Claims, 30 Drawing Sheets

(51) Int. Cl.
    *G06N 3/04*           (2023.01)
    *G06N 3/063*         (2023.01)
    *G06N 3/08*           (2023.01)
    *G11C 11/56*         (2006.01)
    *G11C 16/04*         (2006.01)
    *G11C 16/10*         (2006.01)
    *G11C 16/26*         (2006.01)
    *H01L 25/18*         (2023.01)

(56) References Cited

U.S. PATENT DOCUMENTS

| | | |
|---|---|---|
| 9,799,788 B2 | 10/2017 | Chevallier et al. |
| 2012/0069650 A1 | 3/2012 | Yang et al. |
| 2019/0370639 A1* | 12/2019 | Yu .................. G06N 3/063 |
| 2020/0034697 A1* | 1/2020 | Choi ................ G11C 11/1673 |
| 2020/0192971 A1* | 6/2020 | Lue .................. G11C 16/08 |
| 2020/0301667 A1* | 9/2020 | Hung ................ G11C 11/5628 |
| 2020/0311512 A1 | 10/2020 | Choi et al. |
| 2020/0311523 A1* | 10/2020 | Hoang .............. G06F 9/30029 |
| 2021/0375353 A1* | 12/2021 | Liu .................. G11C 11/4074 |
| 2021/0397930 A1* | 12/2021 | Kulkarni ........... G06F 7/523 |
| 2022/0398438 A1* | 12/2022 | Zhang .............. G11C 11/5642 |

OTHER PUBLICATIONS

Wang, S., "Hybrid Digital and Analog Computing for Efficiency and Generality Optimization," ISSCC ML Processor Forum, Feb. 2021, 46 pages.

Lue, H., et al., "Optimal Design Methods to Transform 3D NAND Flash into a High-Density, High Bandwidth and Low Power Non-volatile Computing in Memory (nvCIM) Accelerator for Deep-Learning Neural Networks (DNN)," IEEE International Electron Devices Meeting (IEDM), Dec. 2019, 4 pages.

* cited by examiner

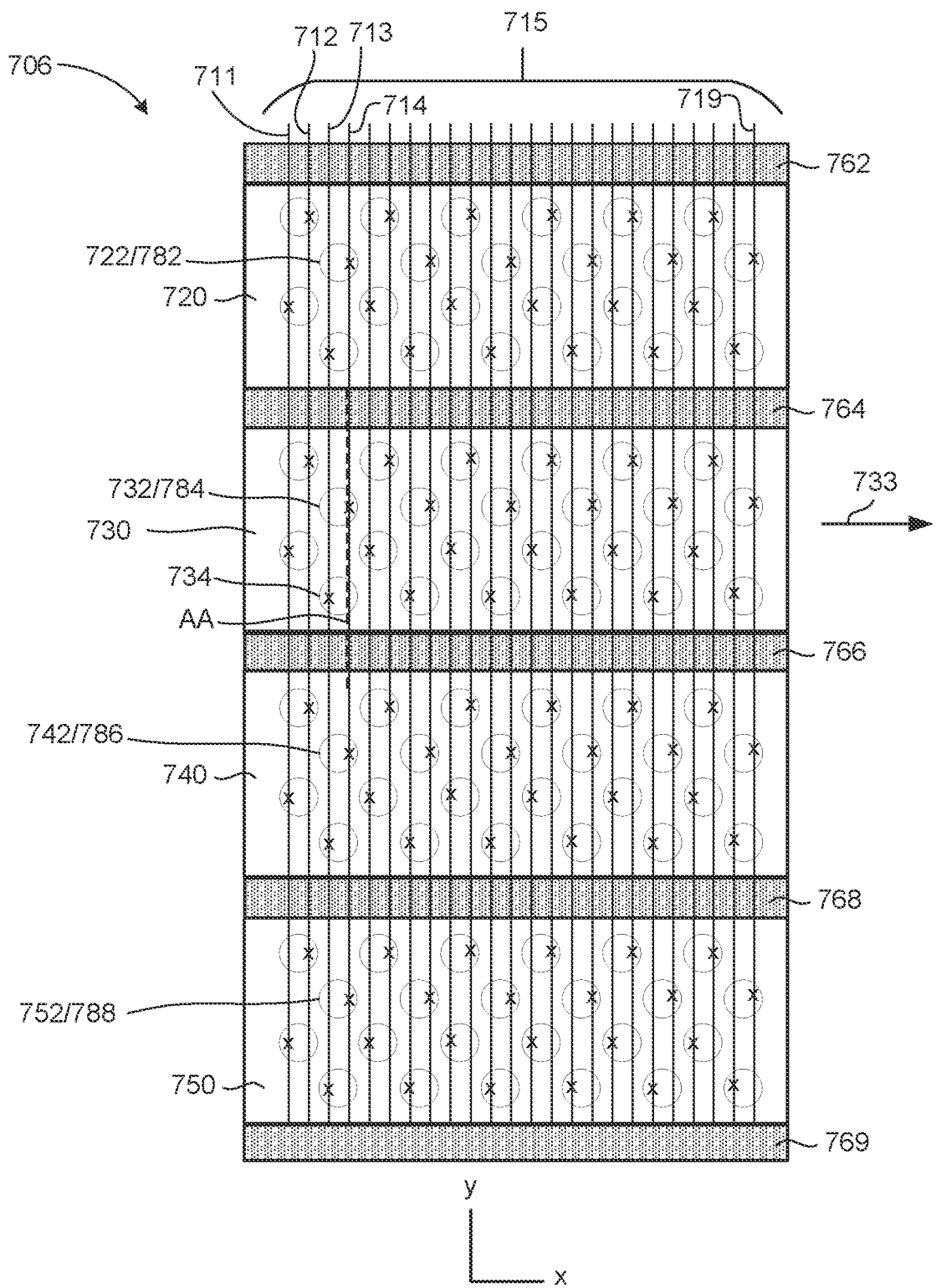

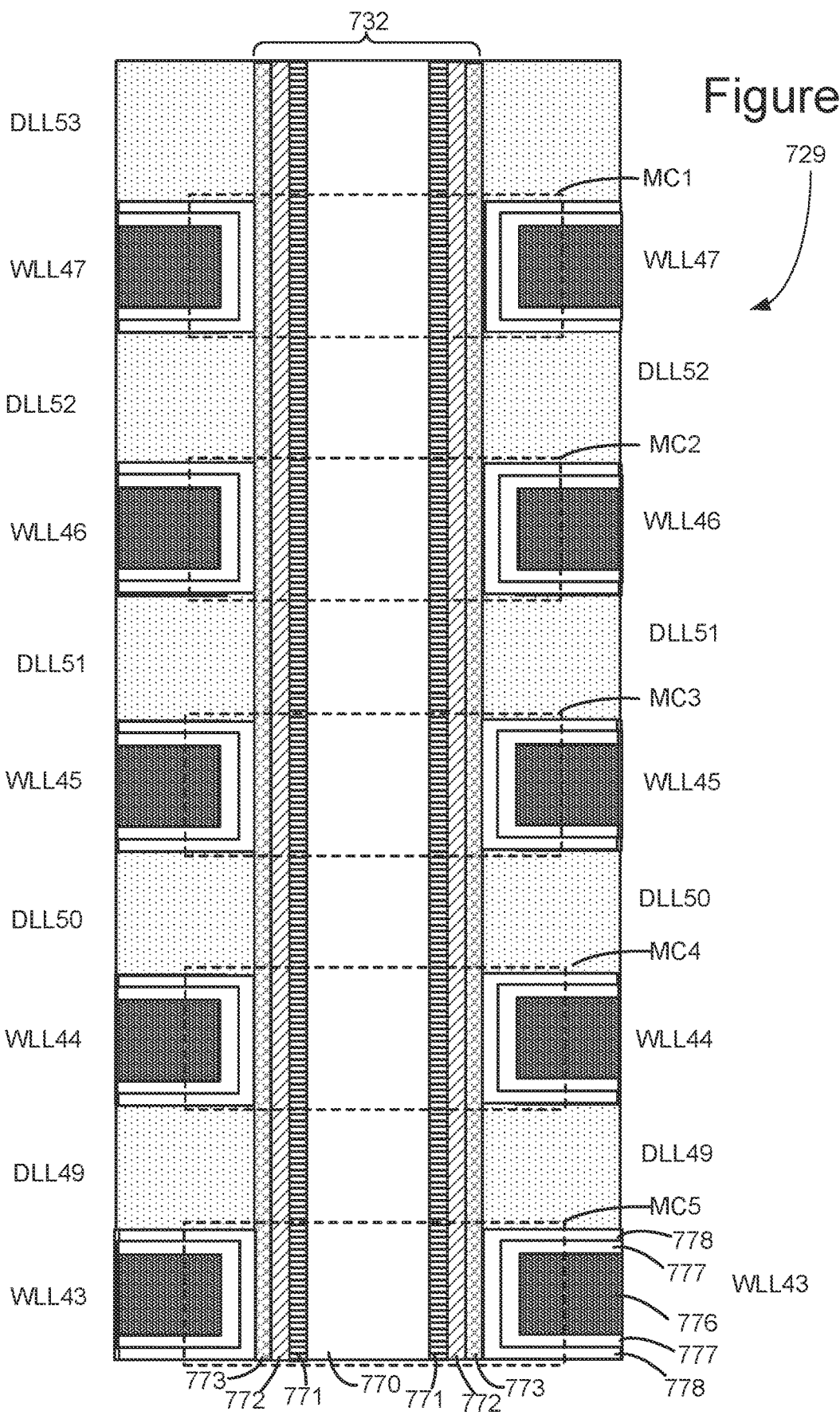

| Cell operation | $OD_1$ | $OD_2$ | $OD_3$ | $OD_4$ |
|---|---|---|---|---|
| | Off | Linear | Linear | On |
| OD (V) | <0 | 1 | 1.5 | >2 |
| Vt (V) | 4 | 2 | 1.5 | 0 |
| VWL (V) | 3 | 3 | 3 | 3 |
| BL current (nA) | <0.1 | 40 | 90 | 140 |

| | Weight component level 1 | Weight component level 2 | Weight component level 3 | Weight component level 4 |
|---|---|---|---|---|
| Cell operation | Off | Linear | Linear | On |
| OD (V) | <0 | 0.6 | 0.95 | >2 |
| Vt (V) | 4 | 2.4 | 2.05 | 0 |
| VWL (V) | 3 | 3 | 3 | 3 |
| BL current (nA) | <0.1 | 6 | 29 | 140 |

|  | Weight component level 1 | Weight component level 2 | Weight component level 3 | Weight component level 4 | Weight component level 5 |
|---|---|---|---|---|---|
| Cell operation | Off | Linear | Linear | On | Combine 4 level 4 and 1 level 2 |
| OD (V) | <0 | 0.6 | 0.95 | >2 | |
| Vt (V) | 4 | 2.4 | 2.05 | 0 | |
| VWL (V) | 3 | 3 | 3 | 3 | 3 |
| BL current (nA) | <0.1 | 6 | 29 | 140 | 566 |

|  | Bit line voltage 1 | Bit line voltage 2 | Bit line voltage 3 | Bit line voltage 4 |
|---|---|---|---|---|
| VBL (V) | 0.15 | 0.25 | 0.35 | 0.45 |
| BL current (nA) | 24 | 40 | 56 | 72 |

|  | Input component level 1 | Input component level 2 | Input component level 3 | Input component level 4 |
|---|---|---|---|---|
| VBL (V) | 0.05 | 0.11 | 0.34 | 1.46 |
| BL current (nA) | 8 | 17.6 | 54.4 | 224 |

Figure 25

|  | Input component level 1 | Input component level 2 | Input component level 3 | Input component level 4 | Input component level 5 |
|---|---|---|---|---|---|
| VBL (V) | 0.05 | 0.11 | 0.34 | 1.46 | Combine 4 level 4 and 1 level 1 |
| BL current (nA) | 8 | 17.6 | 54.4 | 234 | 944 |

Figure 27

COMPUTE IN MEMORY THREE-DIMENSIONAL NON-VOLATILE NAND MEMORY FOR NEURAL NETWORKS WITH WEIGHT AND INPUT LEVEL EXPANSIONS

BACKGROUND

Artificial neural networks are finding increasing usage in artificial intelligence and machine learning applications. In an artificial neural network, a set of inputs is propagated through one or more intermediate, or hidden, layers to generate an output. The layers connecting the input to the output are connected by sets of weights that are generated in a training or learning phase by determining a set of a mathematical manipulations to turn the input into the output, moving through the layers calculating the probability of each output. Once the weights are established, they can be used in the inference phase to determine the output from a set of inputs. Although such neural networks can provide highly accurate results, they are extremely computationally intensive, and the data transfers involved in reading the weights connecting the different layers out of memory and transferring these weights into the processing units of a processing unit can be quite intensive.

BRIEF DESCRIPTION OF THE DRAWING

Like-numbered elements refer to common components in the different figures.

FIG. 7C is a block diagram depicting a top view of a portion of one block from the memory structure.

FIG. 7E depicts a cross sectional view of region of FIG. 7D that includes a portion of a vertical column.

FIG. 25 is a table of bias line bias values and corresponding bit line current values for a four level input embodiment.

FIG. 27 is a table of bias line bias values and corresponding bit line current values for a five level input embodiment, where the fifth bit uses multiple bit lines.

DETAILED DESCRIPTION

Figure 1:
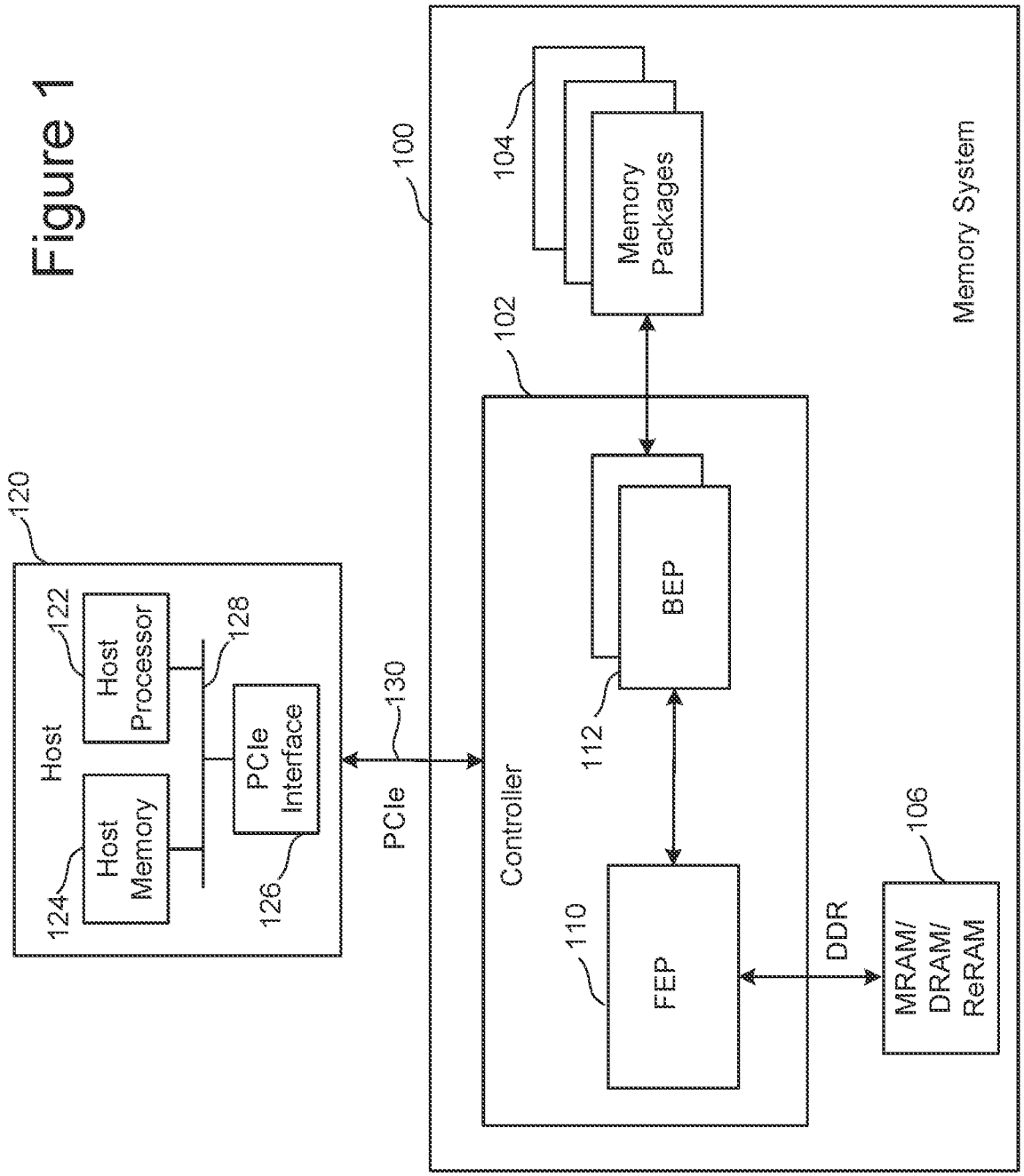
FIG. 1 is a block diagram of one embodiment of a memory system connected to a host.

To efficiently implement the large number of multiplications involved in neural networks, the embodiments described below make use of non-volatile memory arrays in a compute-in-memory approach that stores weight values for layers of the neural network in the non-volatile memory cells of a memory device, with inputs values for the layers applied as voltage levels to the memory arrays. For example, an in-array matrix multiplication between a layer's weights and inputs can be performed by applying the input values for the layer as bias voltages on bit lines, with the resultant currents on source lines corresponding to the product of the weight stored in a corresponding memory cell and the input applied to the bit line. As this operation can be applied to multiple bit lines of an array concurrently, this provides a highly efficient inferencing operation.

To provide higher accuracy, the input values and weight values can be multi-bit values. The following presents techniques for expanding the number of levels of both weights and inputs that can be stored in a NAND memory structure for performing compute in memory multiplication. For higher storage density of weight values, the NAND memory can have a three dimensional architecture.

More specifically, a weight value can be stored in a set of multiple memory cells connected to a word line and between a first bit line of the NAND array and a shared source line. The weight value is encoded as a corresponding set of threshold voltages, where each component of the set of threshold voltages is one of a plurality of threshold voltage value levels. When performing a compute in memory operation, the word line is biased so that, for at least one of the threshold voltage value levels, the memory cell will operation in the linear region. For example, in one embodiment, the threshold voltage levels are selected so that, when biased by a read voltage on the word line, a memory cell programmed to a first of the threshold voltage levels will be in an off state, a memory cell programmed to either of a second or a third of the threshold voltage levels will be in the linear region, and a memory cell programmed to a fourth of the threshold voltage levels will be in an on state. An input value is applied to the bit line and the combined current from the set of memory cells can be sensed on the source line.

To expand the number of input levels, a multi-bit input level can be encoded as a set of one or more input voltages levels, each of the input voltage levels being one of a plurality of voltage levels. The set input voltage levels can be applied to a corresponding set of bit lines, each of the bit lines stored the weight values encoded in a set of memory cells in the same way as for the first bit line, and where the additional sets of memory cells are again connected to the same word line and source line as the set of memory cells connected to the first bit line. The current from all of the sets of memory cells will accumulate on the source line, where it can be sensed to determine the multiplication of the input value and weight value.

FIG. 1 is a block diagram of one embodiment of a memory system 100-+ connected to a host 120. Memory system 100 can implement the technology presented herein for neural network operation. Many different types of memory systems can be used with the technology proposed herein. Example memory systems include solid state drives ("SSDs"), memory cards including dual in-line memories (DIMMs) for DRAM replacement, and embedded memory devices; however, other types of memory systems can also be used.

Memory system 100 of FIG. 1 comprises a controller 102, non-volatile memory 104 for storing data, and local memory (e.g., DRAM/ReRAM) 106. Controller 102 comprises a Front End Processor (FEP) circuit 110 and one or more Back End Processor (BEP) circuits 112. In one embodiment FEP circuit 110 is implemented on an Application Specific Integrated Circuit (ASIC). In one embodiment, each BEP circuit 112 is implemented on a separate ASIC. In other embodiments, a unified controller ASIC can combine both the front end and back end functions. The ASICs for each of the BEP circuits 112 and the FEP circuit 110 are implemented on the same semiconductor such that the controller 102 is manufactured as a System on a Chip ("SoC"). FEP circuit 110 and BEP circuit 112 both include their own processors. In one embodiment, FEP circuit 110 and BEP circuit 112 work as a master slave configuration where the FEP circuit 110 is the master and each BEP circuit 112 is a slave. For example, FEP circuit 110 implements a Flash Translation Layer (FTL) or Media Management Layer (MML) that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory packages/die at the request of FEP circuit 110. For example, the BEP circuit 112 can carry out the read, erase, and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages.

In one embodiment, non-volatile memory 104 comprises a plurality of memory packages. Each memory package includes one or more memory die. Therefore, controller 102 is connected to one or more non-volatile memory die. In one embodiment, each memory die in the memory packages 104 utilize NAND or NOR flash memory (including two dimensional NAND or NOR flash memory and/or three dimensional NAND or NOR flash memory). In other embodiments, the memory package can include other types of memory, such as storage class memory (SCM) based on resistive random access memory (such as ReRAM, MRAM, FeRAM or RRAM) or a phase change memory (PCM). In another embodiment, the BEP or FEP is included on the memory die.

Controller 102 communicates with host 120 via an interface 130 that implements a protocol such as, for example, NVM Express (NVMe) over PCI Express (PCIe) or using JEDEC standard Double Data. Rate (DDR) or Law-Power Double Data Rate (LPDDR) interface such as DDR5 or LPDDR5. For working with memory system 100, host 120 includes a host processor 122, host memory 124, and a PCIe interface 126 connected along bus 128. Host memory 124 is the host's physical memory, and can be DRAM, SRAM, non-volatile memory, or another type of storage. Host 120 is external to and separate from memory system 100. In one embodiment, memory system 100 is embedded in host 120.

Figure 2:
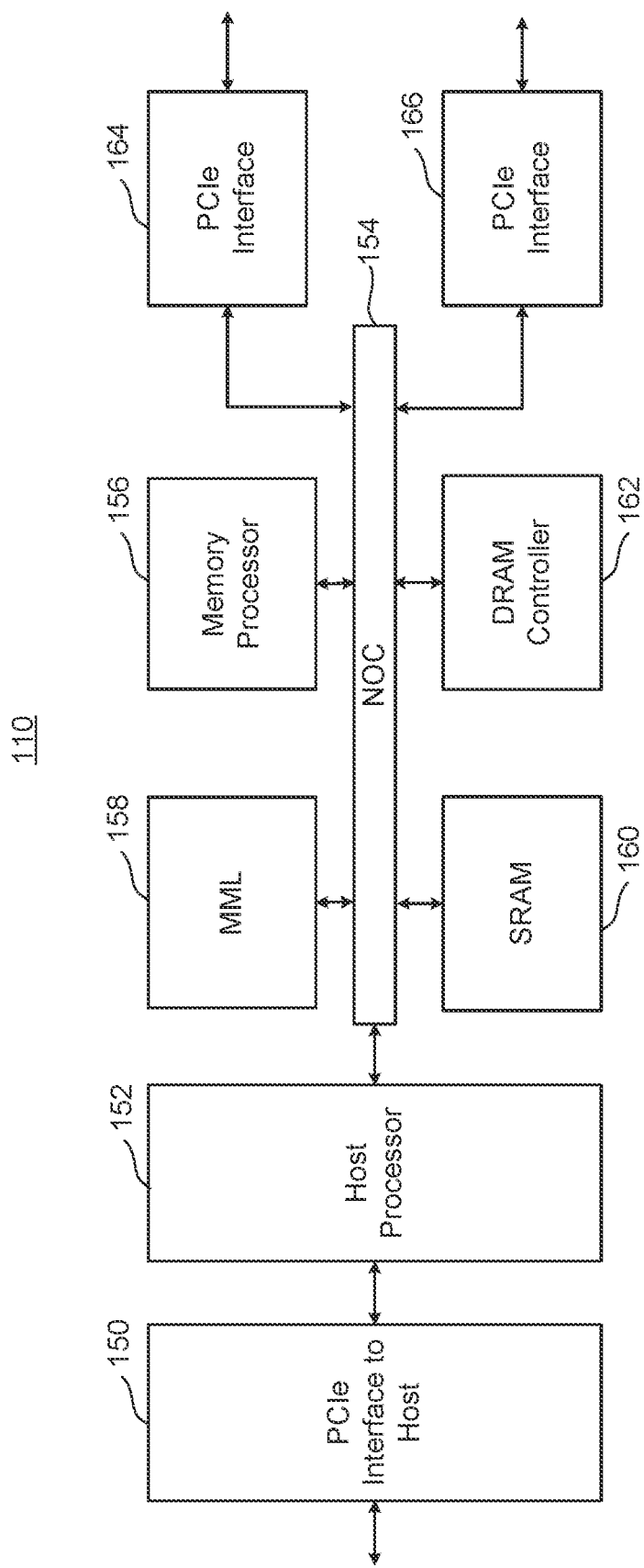
FIG. 2 is a block diagram of one embodiment of a Front End Processor Circuit. In some embodiments, the Front End Processor Circuit is part of a Controller.

FIG. 2 is a block diagram of one embodiment of FEP circuit 110. FIG. 2 shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOCs can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also, in communication with the NOC are two PCIe Interfaces 164 and 166. In the embodiment of FIG. 2, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

FEP circuit 110 can also include a Flash Translation Layer (FTL) or, more generally, a Media Management Layer (MML) 158 that performs memory management (e.g., garbage collection, wear leveling, load balancing, etc.), logical to physical address translation, communication with the host, management of DRAM (local volatile memory) and management of the overall operation of the SSD or other non-volatile storage system. The media management layer MML 158 may be integrated as part of the memory management that may handle memory errors and interfacing with the host. In particular, MML may be a module in the FEP circuit 110 and may be responsible for the internals of memory management. In particular, the MML 158 may include an algorithm in the memory device firmware which translates writes from the host into writes to the memory structure (e.g., 502/602 of FIGS. 5 and 6A below) of a die. The MML 158 may be needed because: 1) the memory may have limited endurance; 2) the memory structure may only be written in multiples of pages; and/or 3) the memory structure may not be written unless it is erased as a block. The MML 158 understands these potential limitations of the memory structure which may not be visible to the host. Accordingly, the MML 158 attempts to translate the writes from host into writes into the memory structure.

Figure 3:
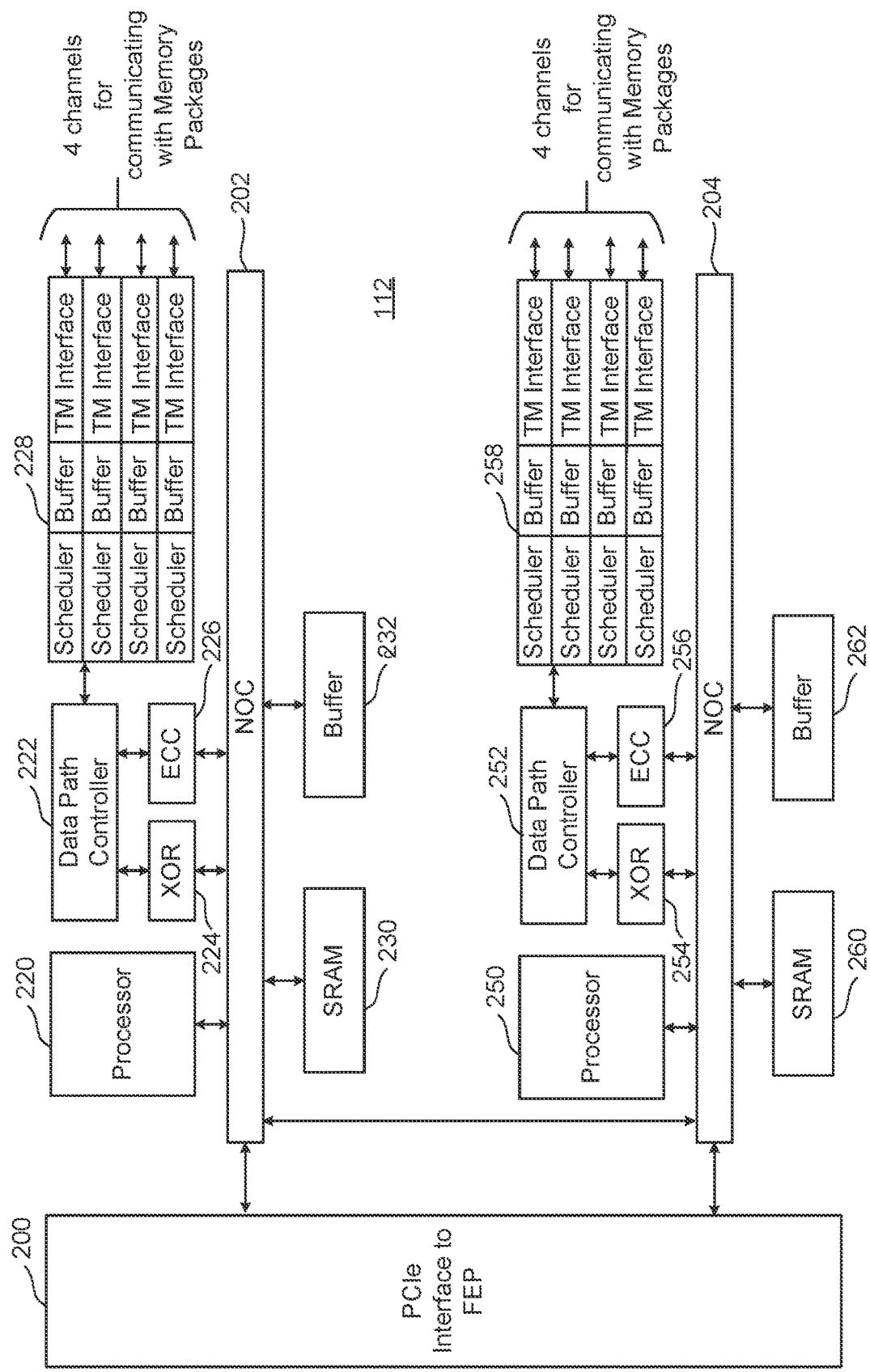
FIG. 3 is a block diagram of one embodiment of a Back End Processor Circuit. In some embodiments, the Back End Processor Circuit is part of a Controller.

FIG. 3 is a block diagram of one embodiment of the BEP circuit 112. FIG. 3 shows a PCIe Interface 200 for communicating with the FEP circuit 110 (e.g., communicating with one of PCIe Interfaces 164 and 166 of FIG. 2). PCIe Interface 200 is in communication with two NOCs 202 and 204. In one embodiment the two NOCs can be combined into one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. Data path controller 222 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer, and TM Interface for each of the channels. The processor can be any standard processor known in the art. The data path controllers 222/252 can be a processor, FPGA, microprocessor, or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

Figure 4:
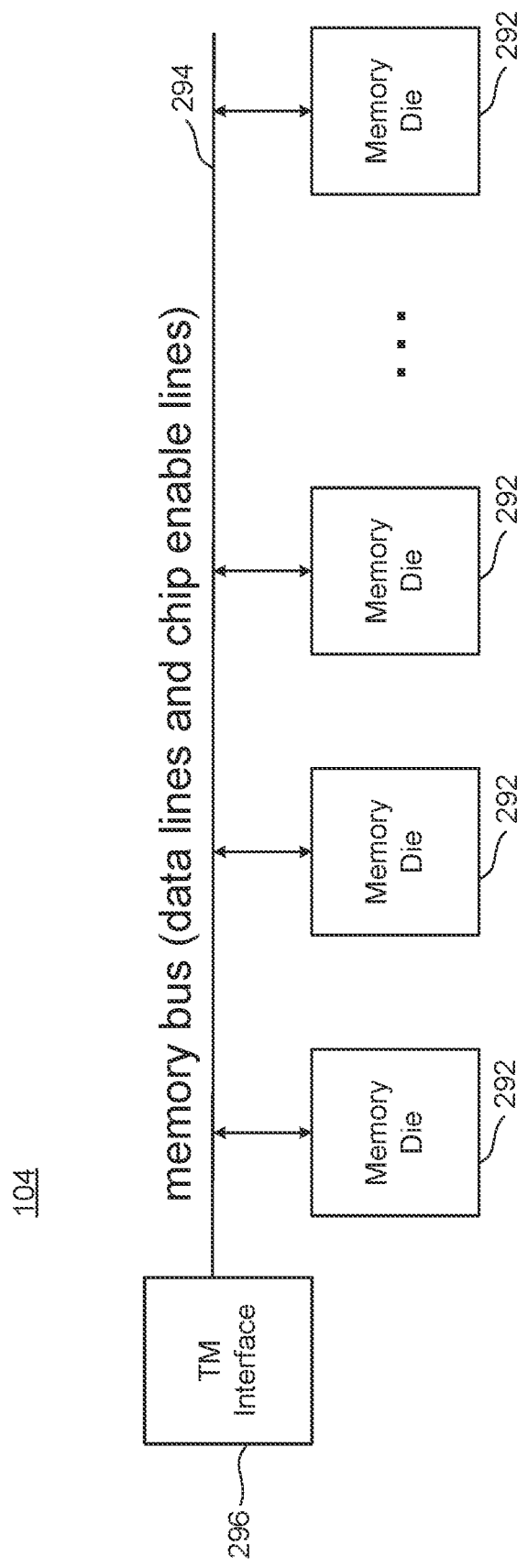
FIG. 4 is a block diagram of one embodiment of a memory package.

FIG. 4 is a block diagram of one embodiment of a memory package 104 that includes a plurality of memory die 292 connected to a memory bus (data lines and chip enable lines) 294. The memory bus 294 connects to a Toggle Mode Interface 296 for communicating with the TM Interface of a BEP circuit 112 (see e.g., FIG. 3). In some embodiments, the memory package can include a small controller connected to the memory bus and the TM Interface. The memory package can have one or more memory die. In one embodiment, each memory package includes eight or 16 memory die; however, other numbers of memory die can also be implemented. In another embodiment, the Toggle Interface is instead JEDEC standard DDR or LPDDR with or without variations such as relaxed time-sets or smaller page size. The technology described herein is not limited to any particular number of memory die.

Figure 5:
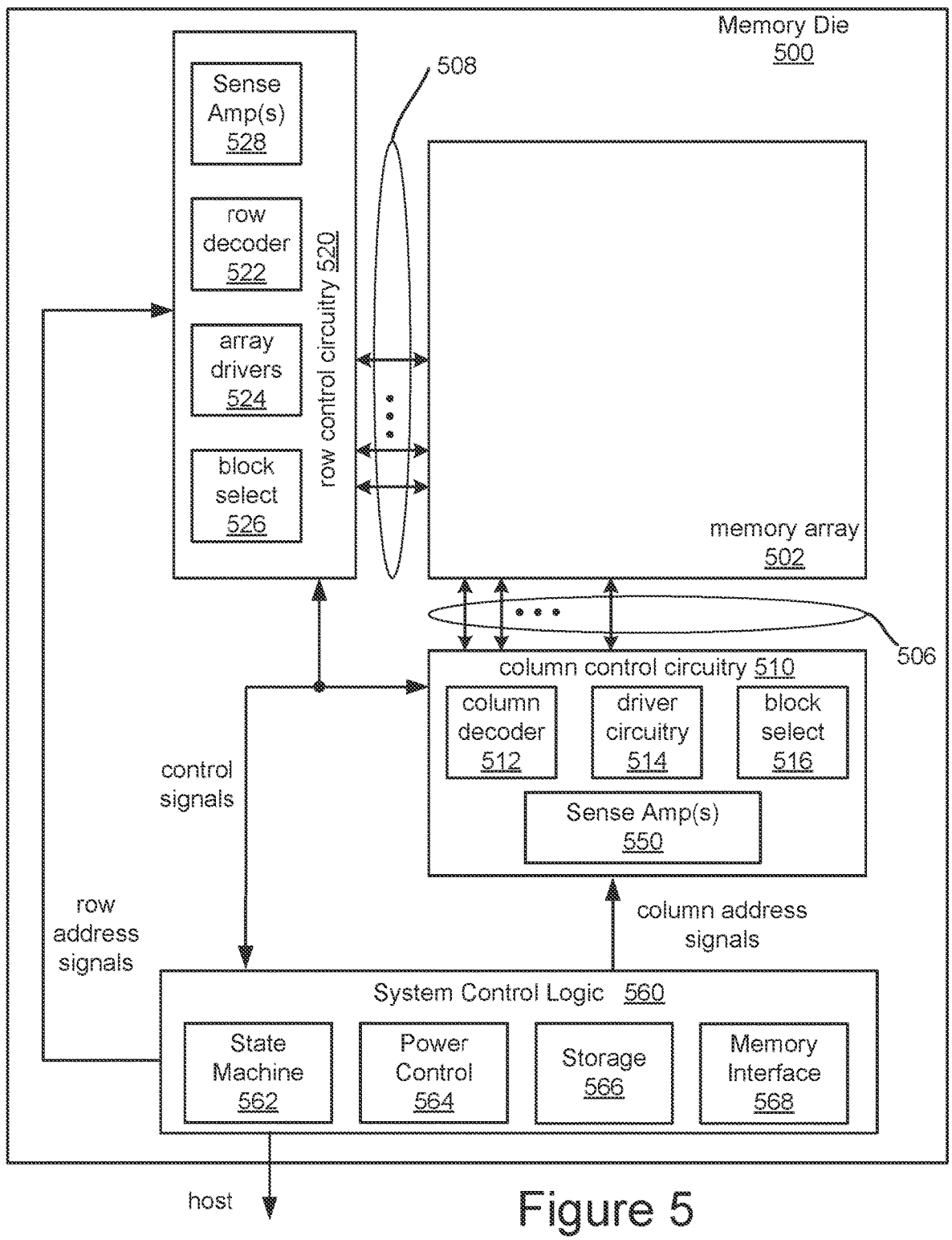
FIG. 5 is a block diagram of one embodiment of a memory die.

FIG. 5 is a block diagram that depicts one example of a memory die 500 that can implement the technology described herein. Memory die 500, which can correspond to one of the memory die 292 of FIG. 4, includes a memory array 502 that can include any of memory cells described in the following. The array terminal lines of memory array 502 include the various layer(s) of word lines organized as rows, and the various layer(s) of bit lines organized as columns. However, other orientations can also be implemented. Memory die 500 includes row control circuitry 520, whose outputs 508 are connected to respective word lines of the memory array 502. Row control circuitry 520 receives a group of M row address signals and one or more various control signals from System Control Logic circuit 560, and typically may include such circuits as row decoders 522, array terminal drivers 524, and block select circuitry 526 for both reading and writing operations. Row control circuitry 520 may also include read/write circuitry. In an embodiment, row control circuitry 520 has sense amplifiers 550, which each contain circuitry for sensing a condition (e.g., voltage) of a word line of the memory array 502. In an embodiment, by sensing a word line voltage, a condition of a memory cell in a cross-point array is determined. Memory die 500 also includes column control circuitry 510 whose input/outputs 506 are connected to respective bit lines of the memory array 502. Although only single block is shown for array 502, a memory die can include multiple arrays or "tiles" that can be individually accessed. Column control circuitry 510 receives a group of N column address signals and one or more various control signals from System Control Logic 560, and typically may include such circuits as column decoders 512, array terminal receivers or drivers 514, block select circuitry 516, as well as read/write circuitry, and I/O multiplexers.

System control logic 560 receives data and commands from a host and provides output data and status to the host. In other embodiments, system control logic 560 receives data and commands from a separate controller circuit and provides output data to that controller circuit, with the controller circuit communicating with the host. In some embodiments, the system control logic 560 can include a state machine 562 that provides die-level control of memory operations. In one embodiment, the state machine 562 is programmable by software. In other embodiments, the state machine 562 does not use software and is completely implemented in hardware (e.g., electrical circuits). In another embodiment, the state machine 562 is replaced by a micro-controller or microprocessor, either on or off the memory chip. The system control logic 560 can also include a power control module 564 controls the power and voltages supplied to the rows and columns of the memory 502 during memory operations and may include charge pumps and regulator circuit for creating regulating voltages. System control logic 560 includes storage 566, which may be used to store parameters for operating the memory array 502.

Commands and data are transferred between the controller 102 and the memory die 500 via memory controller interface 568 (also referred to as a "communication interface"). Memory controller interface 568 is an electrical interface for communicating with memory controller 102. Examples of memory controller interface 568 include a Toggle Mode Interface and an Open NAND Flash Interface (ONFI). Other I/O interfaces can also be used. For example, memory controller interface 568 may implement a Toggle Mode Interface that connects to the Toggle Mode interfaces of memory interface 228/258 for memory controller 102. In one embodiment, memory controller interface 568 includes a set of input and/or output (I/O) pins that connect to the controller 102.

In some embodiments, all of the elements of memory die 500, including the system control logic 560, can be formed as part of a single die. In other embodiments, some or all of the system control logic 560 can be formed on a different die.

For purposes of this document, the phrase "one or more control circuits" can include a controller, a state machine, a micro-controller and/or other control circuitry as represented by the system control logic 560, or other analogous circuits that are used to control non-volatile memory.

In one embodiment, memory structure 502 comprises a three dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping. In one example, the non-volatile memory cells comprise vertical NOR strings with charge-trapping. In another embodiment, memory structure 502 comprises a two dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 502 is not limited to the examples above. Many different types of memory array architectures or memory technologies can be used to form memory structure 502. Other examples of suitable technologies for memory cells of the memory structure 502 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 502 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage, light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 5 can be grouped into two parts, the structure of memory structure 502 of the memory cells and the peripheral circuitry, including all of the other elements. An important characteristic of a memory circuit is its capacity, which can be increased by increasing the area of the memory die of memory system 500 that is given over to the memory structure 502; however, this reduces the area of the memory die available for the peripheral circuitry. This can place quite severe restrictions on these peripheral elements. For example, the need to fit sense amplifier circuits within the available area can be a significant restriction on sense amplifier design architectures. With respect to the system control logic 560, reduced availability of area can limit the available functionalities that can be implemented on-chip. Consequently, a basic trade-off in the design of a memory die for the memory system 500 is the amount of area to devote to the memory structure 502 and the amount of area to devote to the peripheral circuitry.

Another area in which the memory structure 502 and the peripheral circuitry are often at odds is in the processing involved in forming these regions, since these regions often involve differing processing technologies and the trade-off in having differing technologies on a single die. For example, when the memory structure 502 is NAND or NOR flash, this is an NMOS structure, while the peripheral circuitry is often CMOS based. For example, elements such sense amplifier circuits, charge pumps, logic elements in a state machine, and other peripheral circuitry in system control logic 560 often employ PMOS devices. Processing operations for manufacturing a CMOS die will differ in many aspects from the processing operations optimized for an NMOS flash NAND or NOR memory or other memory cell technologies.

To improve upon these limitations, embodiments described below can separate the elements of FIG. 5 onto separately formed dies that are then bonded together. More specifically, the memory structure 502 can be formed on one die and some or all of the peripheral circuitry elements, including one or more control circuits, can be formed on a separate die. For example, a memory die can be formed of just the memory elements, such as the array of memory cells of flash NAND or NOR memory, MRAM memory, PCM memory, ReRAM memory, or other memory type. Some or all of the peripheral circuitry, even including elements such as decoders and sense amplifiers, can then be moved on to a separate die. This allows each of the memory die to be optimized individually according to its technology. For example, a NAND or NOR memory die can be optimized for an NMOS based memory array structure, without worrying about the CMOS elements that have now been moved onto a separate peripheral circuitry die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other memory circuit. Although the following will focus on a bonded memory circuit of one memory die and one peripheral circuitry die, other embodiments can use more die, such as two memory die and one peripheral circuitry die, for example.

Figure 6A:
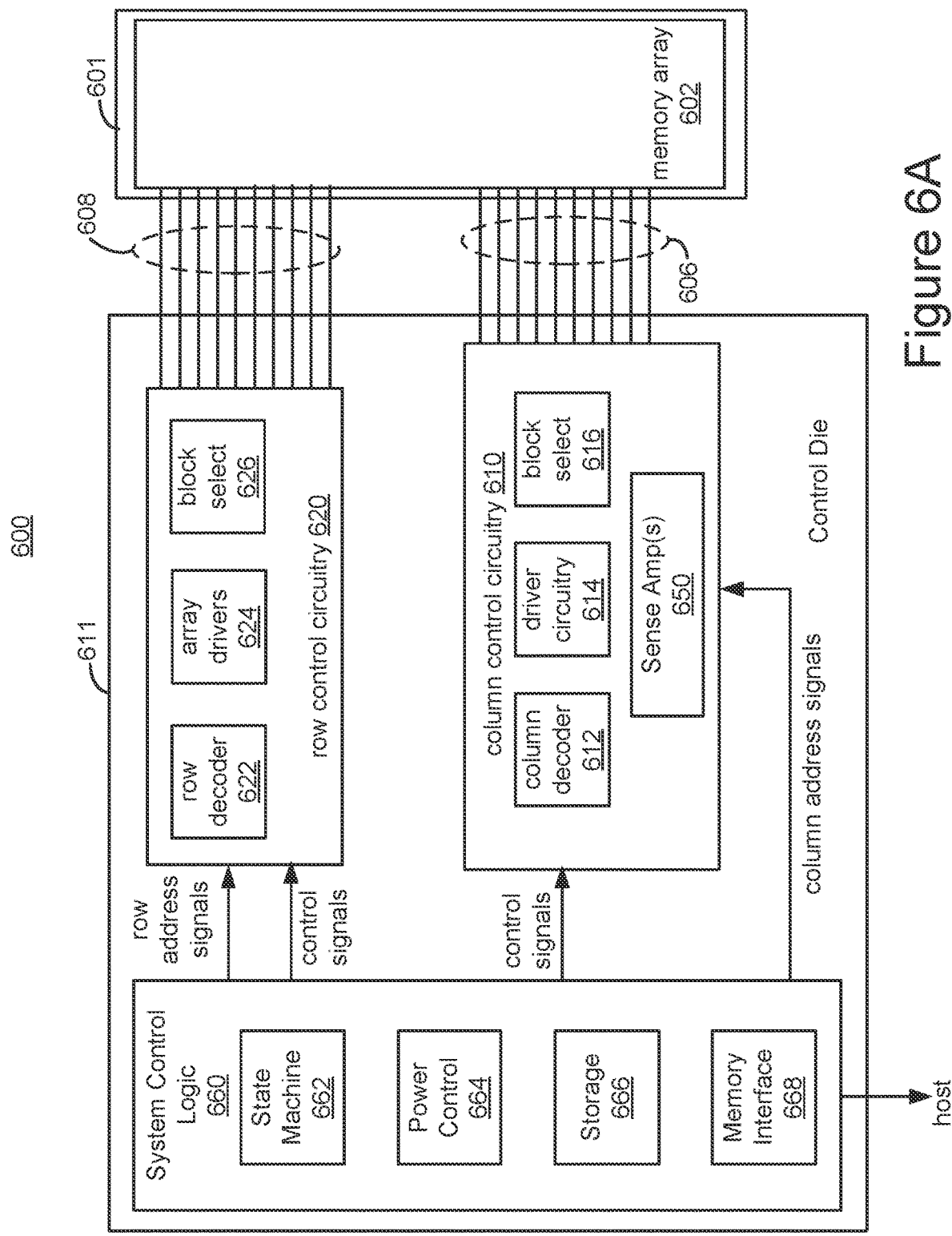
FIGS. 6A and 6B illustrate an example of control circuits coupled to a memory structure through wafer-to-wafer bonding.
Figure 6B:
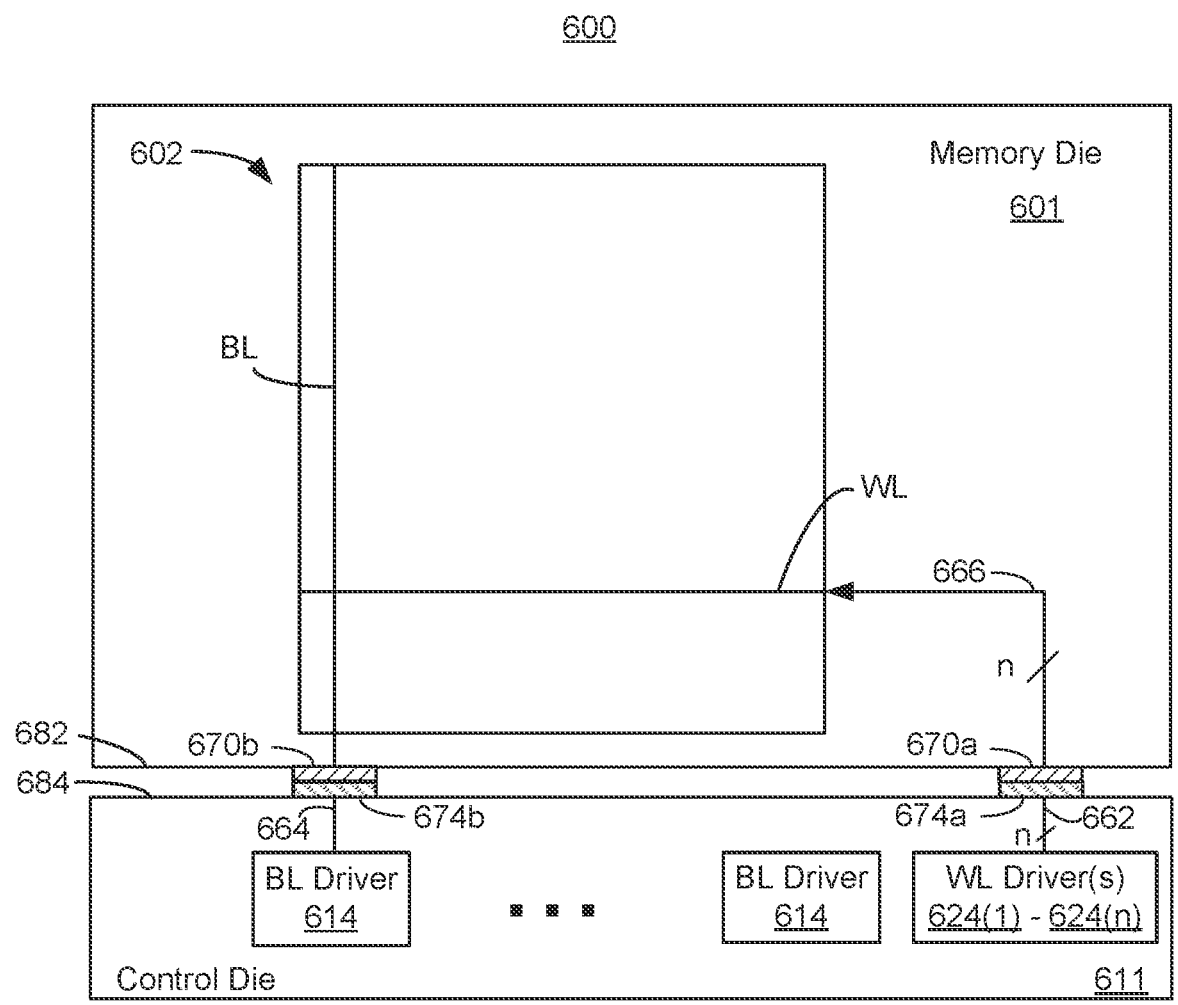

FIGS. 6A and 6B show an alternative arrangement to that of FIG. 5, which may be implemented using wafer-to-wafer bonding to provide a bonded die pair for memory system 600. FIG. 6A shows an example of the peripheral circuitry, including control circuits, formed in a peripheral circuit or control die 611 coupled to memory structure 602 formed in memory die 601. As with 502 of FIG. 5, the memory die 601 can include multiple independently accessible arrays or "tiles". Common components are labelled similarly to FIG. 5 (e.g., 502 is now 602, 510 is now 610, and so on). It can be seen that system control logic 660 (including state machine 662, power control 664, storage 666, and memory interface 668), row control circuitry 620, and column control circuitry 610 are located in control die 611. In some embodiments, all or a portion of the column control circuitry 610 and all or a portion of the row control circuitry 620 are located on the memory structure die 601. In some embodiments, some of the circuitry in the system control logic 660 is located on the on the memory structure die 601.

System control logic 660, row control circuitry 620, and column control circuitry 610 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 660, row control circuitry 620, and column control circuitry 610). Thus, while moving such circuits from a die such as memory die 292 may reduce the number of steps needed to fabricate such a die, adding such circuits to a die such as control die 611 may not require any additional process steps.

FIG. 6A shows column control circuitry 610 on the control die 611 coupled to memory structure 602 on the memory structure die 601 through electrical paths 606. For example, electrical paths 606 may provide electrical connection between column decoder 612, driver circuitry 614, and block select 616 and bit lines of memory structure 602. Electrical paths may extend from column control circuitry 610 in control die 611 through pads on control die 611 that are bonded to corresponding pads of the memory structure die 601, which are connected to bit lines of memory structure 602. Each bit line of memory structure 602 may have a corresponding electrical path in electrical paths 606, including a pair of bond pads, which connects to column control circuitry 610. Similarly, row control circuitry 620, including row decoder 622, array drivers 624, block select 626, and sense amplifiers 650 are coupled to memory structure 602 through electrical paths 608. Each of electrical path 608 may correspond to a word line, dummy word line, or select gate line. Additional electrical paths may also be provided between control die 611 and memory die 601.

For purposes of this document, the phrase "control circuit" can include one or more of controller 102, system control logic 660, column control circuitry 610, row control circuitry 620, a micro-controller, a state machine, and/or other control circuitry, or other analogous circuits that are used to control non-volatile memory. The control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

FIG. 6B is a block diagram showing more detail on the arrangement of one embodiment of the integrated memory assembly of bonded die pair 600. Memory die 601 contains a plane or array 602 of memory cells. The memory die 601 may have additional planes or arrays. One representative bit line (BL) and representative word line (WL) 666 is depicted for each plane or array 602. There may be thousands or tens of thousands of such bit lines per each plane or array 602. In one embodiment, an array or plane represents a groups of connected memory cells that share a common set of unbroken word lines and unbroken bit lines.

Control die 611 includes a number of bit line drivers 614. Each bit line driver 614 is connected to one bit line or may be connected to multiple bit lines in some embodiments. The control die 611 includes a number of word line drivers 624(1)-624(n). The word line drivers 624(1)-624(n) are configured to provide voltages to word lines. In this example, there are "n" word lines per array or plane memory cells. If the memory operation is a program or read, one word line within the selected block is selected for the memory operation, in one embodiment. If the memory operation is an erase, all of the word lines within the selected block are selected for the erase, in one embodiment. The word line drivers 624 provide voltages to the word lines in memory die 601. As discussed above with respect to FIG. 6A, the control die 611 may also include charge pumps, voltage generators, and the like that are not represented in FIG. 6B, which may be used to provide voltages for the word line drivers 624 and/or the bit line drivers 614.

The memory die 601 has a number of bond pads 670a, 670b on a first major surface 682 of memory die 601. There may be "n" bond pads 670a, to receive voltages from a corresponding "n" word line drivers 624(1)-624(n). There may be one bond pad 670b for each bit line associated with array 602. The reference numeral 670 will be used to refer in general to bond pads on major surface 682.

In some embodiments, each data bit and each parity bit of a codeword are transferred through a different bond pad pair 670b, 674b. The bits of the codeword may be transferred in parallel over the bond pad pairs 670b, 674b. This provides for a very efficient data transfer relative to, for example, transferring data between the memory controller 102 and the integrated memory assembly 600. For example, the data bus between the memory controller 102 and the integrated memory assembly 600 may, for example, provide for eight, sixteen, or perhaps 32 bits to be transferred in parallel. However, the data bus between the memory controller 102 and the integrated memory assembly 600 is not limited to these examples.

The control die 611 has a number of bond pads 674a, 674b on a first major surface 684 of control die 611. There may be "n" bond pads 674a, to deliver voltages from a corresponding "n" word line drivers 624(1)-624(n) to memory die 601. There may be one bond pad 674b for each bit line associated with array 602. The reference numeral 674 will be used to refer in general to bond pads on major surface 682. Note that there may be bond pad pairs 670a/674a and bond pad pairs 670b/674b. In some embodiments, bond pads 670 and/or 674 are flip-chip bond pads.

In one embodiment, the pattern of bond pads 670 matches the pattern of bond pads 674. Bond pads 670 are bonded (e.g., flip chip bonded) to bond pads 674. Thus, the bond pads 670, 674 electrically and physically couple the memory die 601 to the control die 611. Also, the bond pads 670, 674 permit internal signal transfer between the memory die 601 and the control die 611. Thus, the memory die 601 and the control die 611 are bonded together with bond pads. Although FIG. 6A depicts one control die 611 bonded to one memory die 601, in another embodiment one control die 611 is bonded to multiple memory dies 601.

Herein, "internal signal transfer" means signal transfer between the control die 611 and the memory die 601. The internal signal transfer permits the circuitry on the control die 611 to control memory operations in the memory die 601. Therefore, the bond pads 670, 674 may be used for memory operation signal transfer. Herein, "memory operation signal transfer" refers to any signals that pertain to a memory operation in a memory die 601. A memory operation signal transfer could include, but is not limited to, providing a voltage, providing a current, receiving a voltage, receiving a current, sensing a voltage, and/or sensing a current.

The bond pads 670, 674 may be formed for example of copper, aluminum, and alloys thereof. There may be a liner between the bond pads 670, 674 and the major surfaces (682, 684). The liner may be formed for example of a titanium/titanium nitride stack. The bond pads 670, 674 and liner may be applied by vapor deposition and/or plating techniques. The bond pads and liners together may have a thickness of 720 nm, though this thickness may be larger or smaller in further embodiments.

Metal interconnects and/or vias may be used to electrically connect various elements in the dies to the bond pads 670, 674. Several conductive pathways, which may be implemented with metal interconnects and/or vias are depicted. For example, a sense amplifier may be electrically connected to bond pad 674b by pathway 664. Relative to FIG. 6A, the electrical paths 606 can correspond to pathway 664, bond pads 674b, and bond pads 670b. There may be thousands of such sense amplifiers, pathways, and bond pads. Note that the BL does not necessarily make direct connection to bond pad 670b. The word line drivers 624 may be electrically connected to bond pads 674a by pathways 662. Relative to FIG. 6A, the electrical paths 608 can correspond to the pathway 662, the bond pads 674a, and bond pads 670a. Note that pathways 662 may comprise a separate conductive pathway for each word line driver 624(1)-624(n). Likewise, a there may be a separate bond pad 674a for each word line driver 624(1)-624(n). The word lines in block 2 of the memory die 601 may be electrically connected to bond pads 670a by pathways 664. In FIG. 7, there are "n" pathways 664, for a corresponding "n" word lines in a block. There may be separate pair of bond pads 670a, 674a for each pathway 664.

Relative to FIG. 5, the on-die control circuits of FIG. 6A can also include addition functionalities within its logic elements, both more general capabilities than are typically found in the memory controller 102 and some CPU capabilities, but also application specific features.

In the following, system control logic 560/660, column control circuitry 510/610, row control circuitry 520/620, and/or controller 102 (or equivalently functioned circuits), in combination with all or a subset of the other circuits depicted in FIG. 5 or on the control die 611 in FIG. 6A and similar elements in FIG. 5, can be considered part of the one or more control circuits that perform the functions described herein. The control circuits can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

In the following discussion, the memory array 502/602 of FIGS. 5 and 6A will mainly be discussed in the context of a three dimensional NAND memory. FIGS. 7A-7F provide more detail for an embodiment of a 3D NAND memory structure.

Figure 7A:
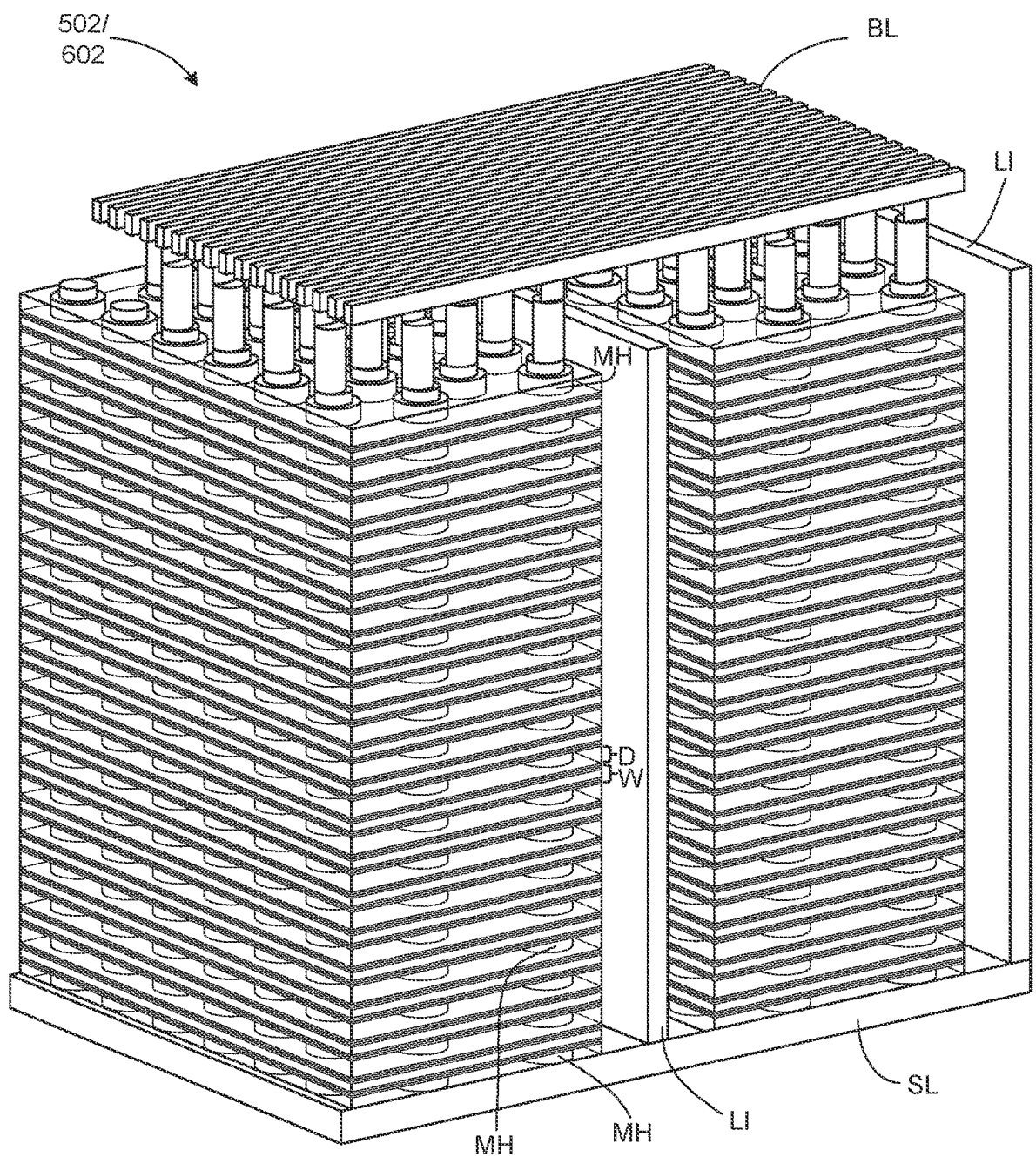
FIG. 7A is a perspective view of a portion of one example embodiment of a monolithic three dimensional memory array that can comprise memory structure.

FIG. 7A is a perspective view of a portion of one example embodiment of a monolithic three dimensional memory array that can comprise memory structure 302, which includes a plurality non-volatile memory cells. For example, FIG. 7A shows a portion of one block comprising memory. The structure depicted includes a set of bit lines BL positioned above a stack of alternating dielectric layers and conductive layers with vertical columns of materials extending through the dielectric layers and conductive layers. For example purposes, one of the dielectric layers is marked as D and one of the conductive layers (also called word line layers) is marked as W. The word line layers contain one or more word lines that are connected to memory cells. For example, a word line may be connected to a control gate of a memory cell. The number of alternating dielectric layers and conductive layers can vary based on specific implementation requirements. One set of embodiments includes between 108-304 alternating dielectric layers and conductive layers. One example embodiment includes 96 data word line layers, 8 select layers, 6 dummy word line layers and 110 dielectric layers. More or fewer than 108-304 layers can also be used. The alternating dielectric layers and conductive layers are divided into four "fingers" or sub-blocks by local interconnects LI, in an embodiment. FIG. 7A shows two fingers and two local interconnects LI. Below the alternating dielectric layers and word line layers is a source line layer SL. Vertical columns of materials (also known as memory holes) are formed in the stack of alternating dielectric layers and conductive layers. For example, one of the vertical columns/memory holes is marked as Note that in FIG. 7A, the dielectric layers are depicted as see-through so that the reader can see the memory holes positioned in the stack of alternating dielectric layers and conductive layers. In one embodiment, NAND strings are formed by filling the vertical column/memory hole with materials including a charge-trapping material to create a vertical column of memory cells. Each memory cell can store one or more bits of data.

Figure 7B:
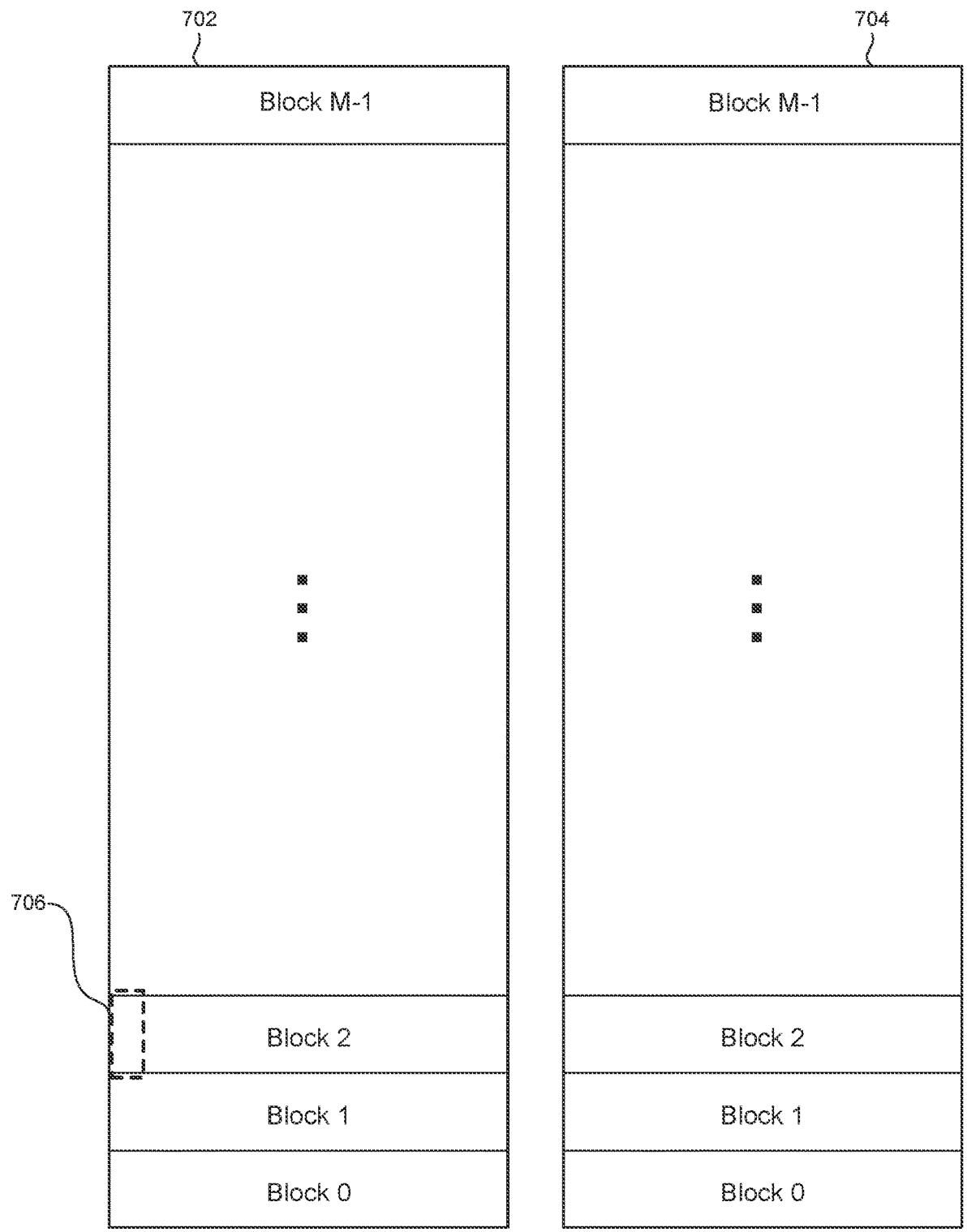
FIG. 7B is a block diagram explaining one example organization of memory structure.

FIG. 7B is a block diagram explaining one example organization of memory structure 302, which is divided into two planes 702 and 704. Each plane is then divided into M blocks. In one example, each plane has about 2000 blocks. However, different numbers of blocks and planes can also be used. In one embodiment, for two plane memory, the block IDs are usually such that even blocks belong to one plane and odd blocks belong to another plane; therefore, plane 702 includes block 0, 2, 4, 6, . . . and plane 704 includes blocks 1, 3, 5, 7, . . . In on embodiment, a block of memory cells is a unit of erase. That is, all memory cells of a block are erased together. In other embodiments, memory cells can be grouped into blocks for other reasons, such as to organize the memory structure 302 to enable the signaling and selection circuits.

Figure 7D:
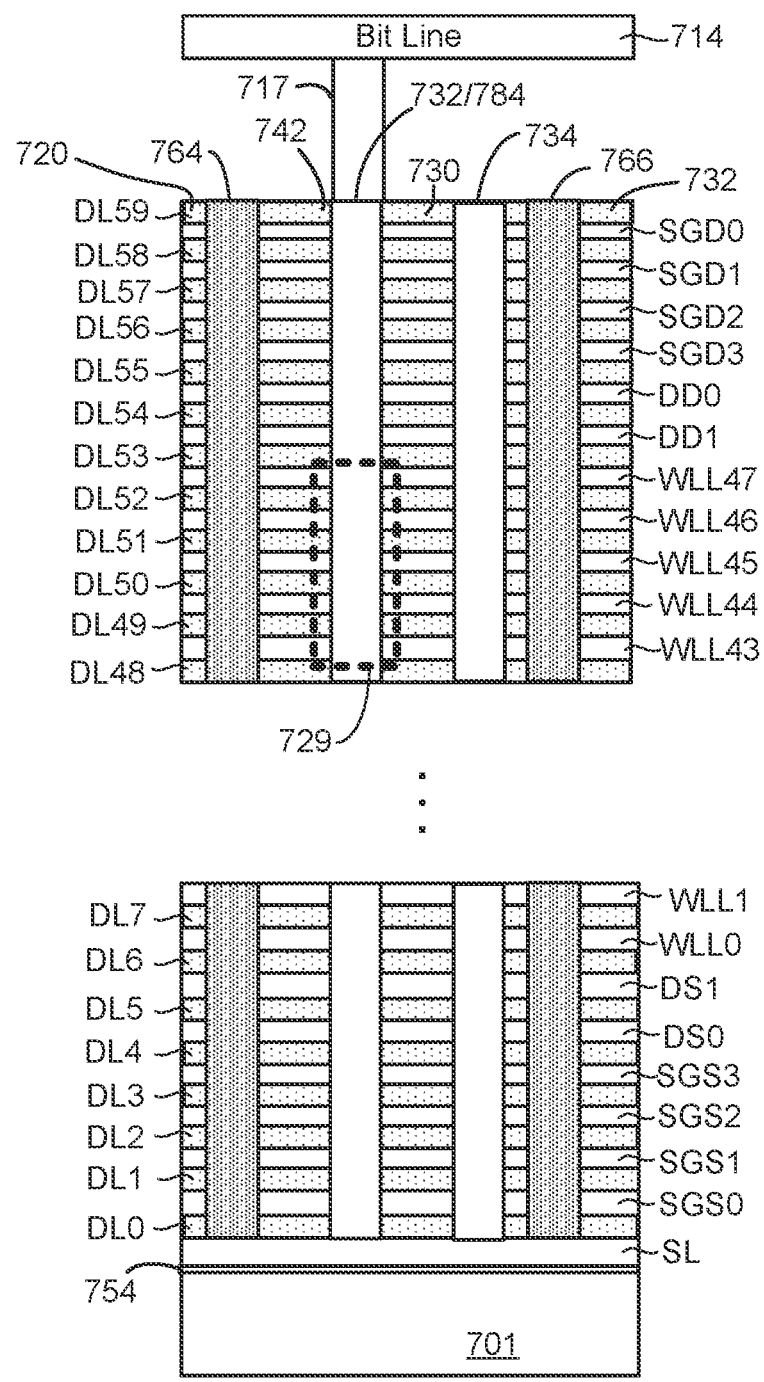
FIG. 7D depicts a portion of an embodiment of three dimensional memory structure showing a cross-sectional view along line AA of FIG. 7C.

FIGS. 7C-7E depict an example 3D NAND structure. FIG. 7C is a block diagram depicting a top view of a portion of one block from memory structure 302. The portion of the block depicted in FIG. 7C corresponds to portion 706 in block 2 of FIG. 7B. As can be seen from FIG. 7C, the block depicted in FIG. 7C extends in the direction of 733. In one embodiment, the memory array will have 60 layers. Other embodiments have less than or more than 60 layers. However, FIG. 7C only shows the top layer.

FIG. 7C depicts a plurality of circles that represent the vertical columns. Each of the vertical columns include multiple select transistors and multiple memory cells. In one embodiment, each vertical column implements a NAND string. For example, FIG. 7C depicts vertical columns 722, 732, 742 and 752. Vertical column 722 implements NAND string 782. Vertical column 732 implements NAND string 784. Vertical column 742 implements NAND string 786. Vertical column 752 implements NAND string 788. More details of the vertical columns are provided below. Since the block depicted in FIG. 7C extends in the direction of arrow 733 and in the direction of arrow 733, the block includes more vertical columns than depicted in FIG. 7C.

FIG. 7C also depicts a set of bit lines 715, including bit lines 711, 712, 713, 714, . . . , 719. FIG. 7C shows twenty four bit lines because only a portion of the block is depicted. It is contemplated that more than twenty four bit lines connected to vertical columns of the block. Each of the circles representing vertical columns has an "x" to indicate its connection to one bit line. For example, bit line 714 is connected to vertical columns 722, 732, 742 and 752.

The block depicted in FIG. 7C includes a set of local interconnects 762, 764, 766, 768 and 769 that connect the various layers to a source line below the vertical columns. Local interconnects 762, 764, 766, 768 and 769 also serve to divide each layer of the block into four regions; for example, the top layer depicted in FIG. 7C is divided into regions 720, 730, 740 and 750, which are referred to as fingers or sub-blocks. In the layers of the block that implement memory cells, the four regions are referred to as word line sub-blocks that are separated by the local interconnects. In one embodiment, the word line sub-blocks on a common level of a block connect together at the end of the block to form a single word line. In another embodiment, the word line sub-blocks on the same level are not connected together. In one example implementation, a bit line only connects to one vertical column in each of regions 720, 730, 740 and 750. In that implementation, each block has sixteen rows of active columns and each bit line connects to four rows in each block. In one embodiment, all of four rows connected to a common bit line are connected to the same word line (via different word line sub-blocks on the same level that are connected together); therefore, the system uses the source side select lines and the drain side select lines to choose one (or another subset) of the four to be subjected to a memory operation (program, verify, read, and/or erase).

Although FIG. 7C shows each region having four rows of vertical columns, four regions and sixteen rows of vertical columns in a block, those exact numbers are an example implementation. Other embodiments may include more or fewer regions per block, more or fewer rows of vertical columns per region and more or fewer rows of vertical columns per block.

FIG. 7C also shows the vertical columns being staggered. In other embodiments, different patterns of staggering can be used. In some embodiments, the vertical columns are not staggered.

FIG. 7D depicts a portion of an embodiment of three dimensional memory structure 302 showing a cross-sectional view along line AA of FIG. 7C. This cross sectional view cuts through vertical columns 732 and 734 and region 730 (see FIG. 7C). The structure of FIG. 7D includes four drain side select layers SGD0, SGD1, SGD2 and SGD3; four source side select layers SGS0, SGS1, SGS2 and SGS3; four dummy word line layers DD0, DD1, DS0 and DS1; and forty eight data word line layers WLL0-WLL47 for connecting to data memory cells. Other embodiments can implement more or less than four drain side select layers, more or less than four source side select layers, more or fewer than four dummy word line layers, and more or fewer than forty eight word line layers (e.g., 96 word line layers). Vertical columns 732 and 734 are depicted protruding through the drain side select layers, source side select layers, dummy word line layers and word line layers. In one embodiment, each vertical column comprises a NAND string. For example, vertical column 732 comprises NAND string 784. Below the vertical columns and the layers listed below is substrate 701, an insulating film 754 on the substrate, and source line SL. The NAND string of vertical column 732 has a source end at a bottom of the stack and a drain end at a top of the stack. As in agreement with FIG. 7C, FIG. 7D show vertical column 732 connected to Bit Line 714 via connector 717. Local interconnects 764 and 766 are also depicted.

For ease of reference, drain side select layers SGD0, SGD1, SGD2 and SGD3; source side select layers SGS0, SGS1, SGS2 and SGS3; dummy word line layers DD0, DD1, DS0 and DS1; and word line layers WLL0-WLL47 collectively are referred to as the conductive layers. In one embodiment, the conductive layers are made from a combination of TiN and tungsten. In other embodiments, other materials can be used to form the conductive layers, such as doped polysilicon, metal such as tungsten or metal silicide. In some embodiments, different conductive layers can be formed from different materials. Between conductive layers are dielectric layers DL0-DL59. For example, dielectric layers DL49 is above word line layer WLL43 and below word line layer WLL44. In one embodiment, the dielectric layers are made from $SiO_2$. In other embodiments, other dielectric materials can be used to form the dielectric layers.

The non-volatile memory cells are formed along vertical columns which extend through alternating conductive and dielectric layers in the stack. In one embodiment, the memory cells are arranged in NAND strings. The word line layer WLL0-WLL47 connect to memory cells (also called data memory cells). Dummy word line layers DD0, DD1, DS0 and DS1 connect to dummy memory cells. A dummy memory cell does not store user data, while a data memory cell is eligible to store user data. Drain side select layers SGD0, SGD1, SGD2 and SGD3 are used to electrically connect and disconnect NAND strings from bit lines. Source side select layers SGS0, SGS1, SGS2 and SGS3 are used to electrically connect and disconnect NAND strings from the source line SL.

In some embodiments, the word lines are read sequentially, which means that the word lines are read either from low to high (e.g., WLL0 to WLL47) or from high to low (e.g., WLL47 to WLL0). It is not required to read the entire set of word lines when reading sequentially. Techniques are disclosed herein for providing compensation for interference caused by adjacent memory cells on target memory cells during a sequential read.

In some embodiments, the read of an individual word line is broken down into separate reads of sub-blocks. Referring again to FIG. 7C, the block is divided into four sub-blocks 720, 730, 740, 750. Thus, the four sub-blocks on one word line layer may be read, prior to reading the four sub-blocks on an adjacent word line layer. In some embodiments, data state information is used to provide compensation on a sub-block basis. For example, data state information for memory cells at WLL35 is kept for each of the four sub-blocks 720-750. Then, when reading sub-block 720 at WLL36 the data state information for sub-block 720 at WLL35 is used to compensate for interference from adjacent memory cells in sub-block 720 at WLL35, when reading sub-block 730 at WLL36 the data state information for sub-block 730 at WLL35 is used to compensate for interference from adjacent memory cells in sub-block 720 at WLL35, etc.

FIG. 7E depicts a cross sectional view of region 729 of FIG. 7D that includes a portion of vertical column 732. In one embodiment, the vertical columns are round and include four layers; however, in other embodiments more or less than four layers can be included and other shapes can be used. In one embodiment, vertical column 732 includes an inner core layer 770 that is made of a dielectric, such as $SiO_2$. Other materials can also be used. Surrounding inner core 770 is polysilicon channel 771. Materials other than polysilicon can also be used. Note that it is the channel 771 that connects to the bit line. Surrounding channel 771 is a tunneling dielectric 772. In one embodiment, tunneling dielectric 772 has an ONO structure. Surrounding tunneling dielectric 772 is charge trapping layer 773, such as (for example) Silicon Nitride. Other memory materials and structures can also be used. The technology described herein is not limited to any particular material or structure.

FIG. 7E depicts dielectric layers DLL49, DLL50, DLL51, DLL52 and DLL53, as well as word line layers WLL43, WLL44, WLL45, WLL46, and WLL47. Each of the word line layers includes a word line region 776 surrounded by an aluminum oxide layer 777, which is surrounded by a blocking oxide ($SiO_2$) layer 778. The physical interaction of the word line layers with the vertical column forms the memory cells. Thus, a memory cell, in one embodiment, comprises channel 771, tunneling dielectric 772, charge trapping layer 773, blocking oxide layer 778, aluminum oxide layer 777 and word line region 776. For example, word line layer WLL47 and a portion of vertical column 732 comprise a memory cell MC1. Word line layer WLL46 and a portion of vertical column 732 comprise a memory cell MC2. Word line layer WLL45 and a portion of vertical column 732 comprise a memory cell MC3. Word line layer WLL44 and a portion of vertical column 732 comprise a memory cell MC4. Word line layer WLL43 and a portion of vertical column 732 comprise a memory cell MC5. In other architectures, a memory cell may have a different structure; however, the memory cell would still be the storage unit.

Note that the charge trapping layer 773 may extend from one end of the NAND string to the other, and hence may be referred to herein as a continuous charge trapping layer. When a memory cell is programmed, electrons are stored in a portion of the charge trapping layer 773 which is associated with the memory cell. These electrons are drawn into the charge trapping layer 773 from the channel 771, through the tunneling dielectric 772, in response to an appropriate voltage on word line region 776. The Vt of a memory cell is increased in proportion to the amount of stored charge. In one embodiment, the programming is achieved through Fowler-Nordheim tunneling of the electrons into the charge trapping layer. During an erase operation, the electrons return to the channel or holes are injected into the charge trapping layer to recombine with electrons. In one embodiment, erasing is achieved using hole injection into the charge trapping layer via a physical mechanism such as gate induced drain leakage (GIDL).

Figure 7F:
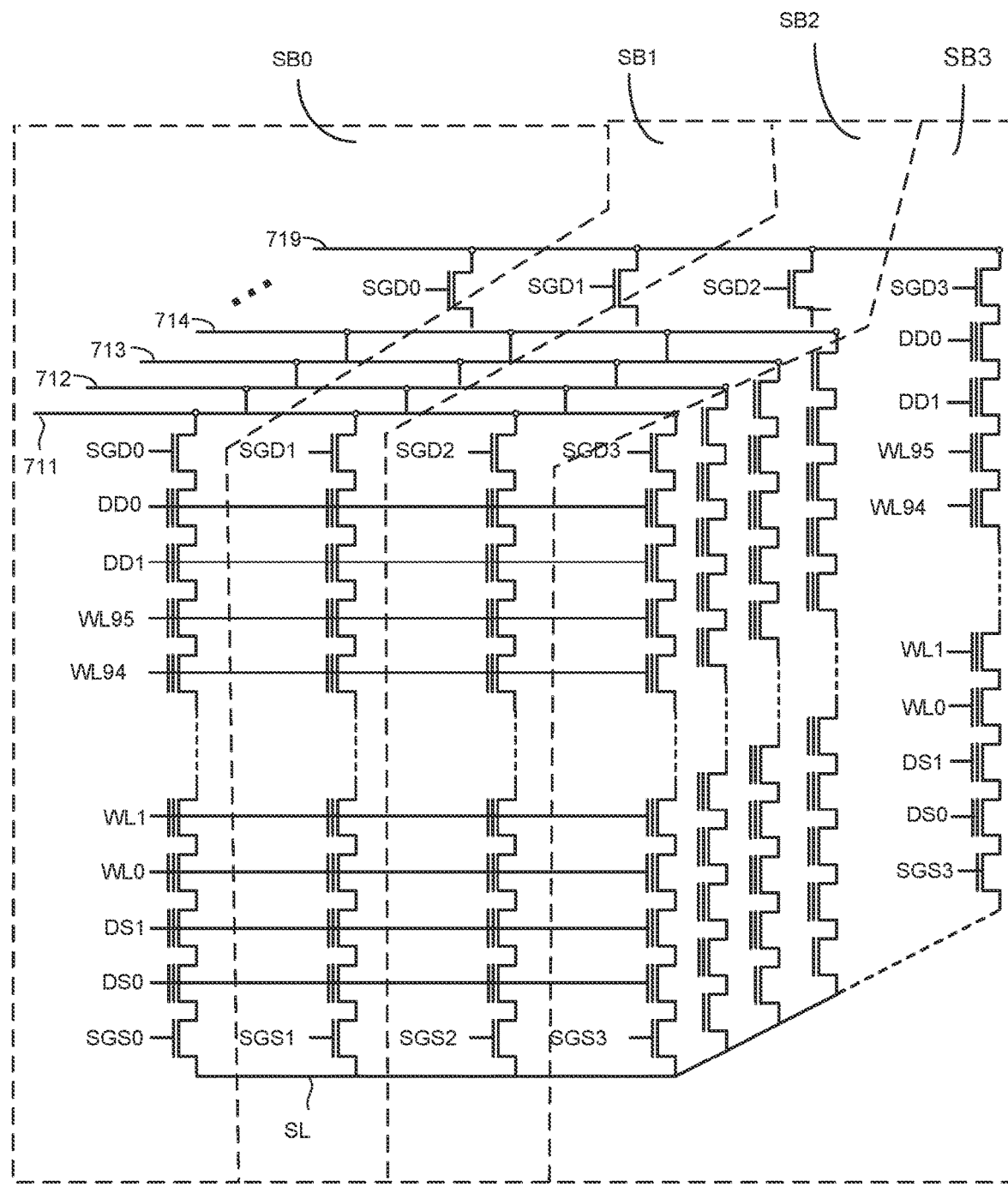
FIG. 7F is a schematic of a plurality of NAND strings showing multiple sub-blocks.

FIG. 7F is a schematic diagram of a portion of the memory depicted in in FIGS. 7A-7E. FIG. 4F shows physical word lines WLL0-WLL95 running across the entire block. The structure of FIG. 4F corresponds to portion 706 in Block 2 of FIGS. 7A-7E, including bit lines 711, 712, 713, 714, . . . , 719. Within the block, each bit line is connected to four NAND strings. Drain side selection lines SGD0, SGD1, SGD2 and SGD3 are used to determine which of the four NAND strings connect to the associated bit line(s). Source side selection lines SGS0, SGS1, SGS2 and SGS3 are used to determine which of the four NAND strings connect to the common source line. The block can also be thought of as divided into four sub-blocks SB0, SB1, SB2 and SB3. Sub-block SB0 corresponds to those vertical NAND strings controlled by SGD0 and SGS0, sub-block SB1 corresponds to those vertical NAND strings controlled by SGD1 and SGS1, sub-block SB2 corresponds to those vertical NAND strings controlled by SGD2 and SGS2, and sub-block SB3 corresponds to those vertical NAND strings controlled by SGD3 and SGS3.

Although the example memory system of FIGS. 7A-7F is a three dimensional memory structure that includes vertical NAND strings with charge-trapping material, other (2D and 3D) memory structures can also be used with the technology described herein.

Turning now to types of data that can be stored in non-volatile memory devices, a particular example of the type of data of interest in the following discussion is the weights used is in artificial neural networks, such as convolutional neural networks (CNNs) or generative pre-trained transformers (GPTs). The name "convolutional neural network" indicates that the network employs a mathematical operation called convolution, that is a specialized kind of linear operation. Convolutional networks are neural networks that use convolution in place of general matrix multiplication in at least one of their layers. A CNN is formed of an input and an output layer, with a number of intermediate hidden layers. The hidden layers of a CNN are typically a series of convolutional layers that "convolve" with a multiplication or other dot product.

Each neuron in a neural network computes an output value by applying a specific function to the input values coming from the receptive field in the previous layer. The function that is applied to the input values is determined by a vector of weights and a bias. Learning, in a neural network, progresses by making iterative adjustments to these biases and weights. The vector of weights and the bias are called filters and represent particular features of the input (e.g., a particular shape). A distinguishing feature of CNNs is that many neurons can share the same filter.

Figure 8:
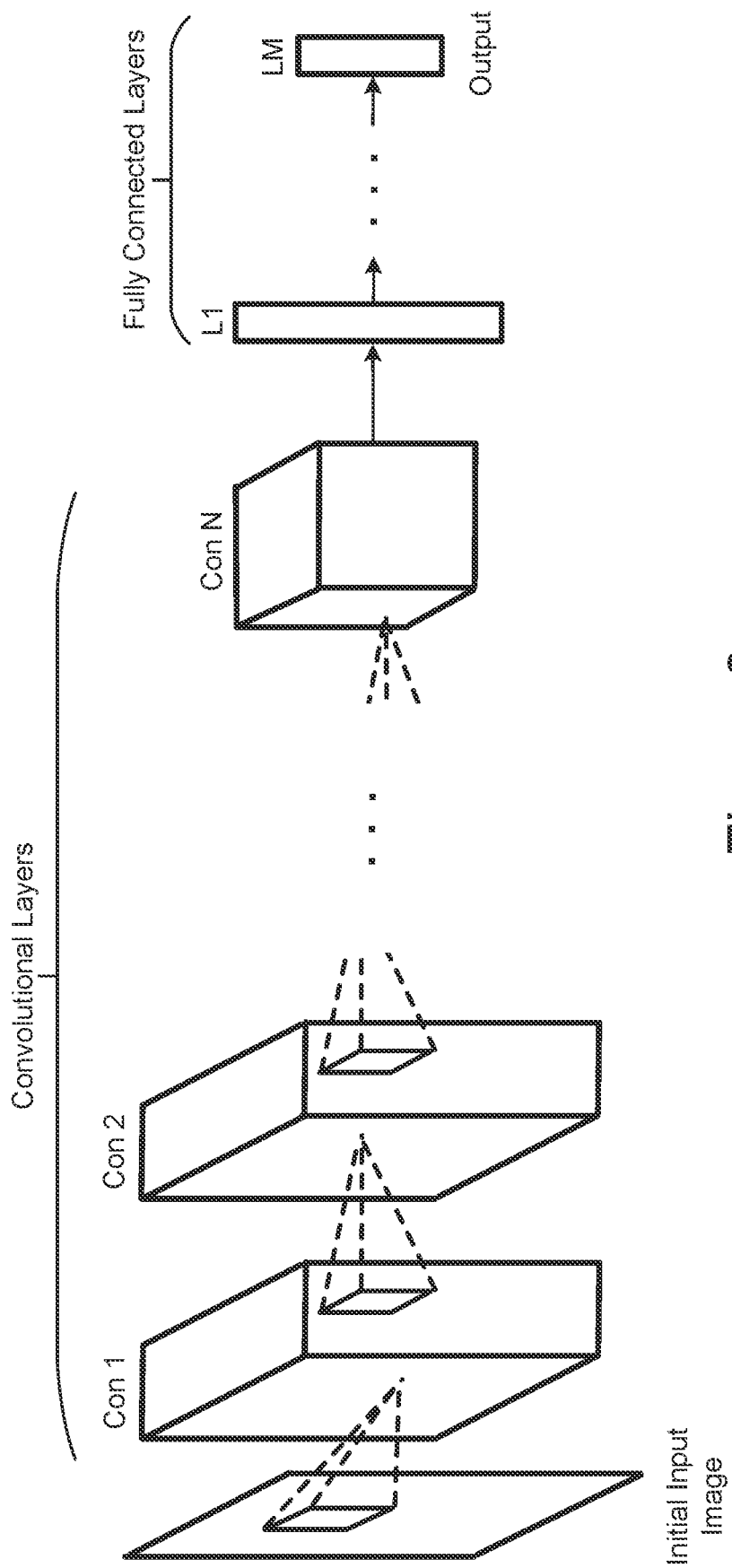
FIG. 8 illustrates a simple example of a convolutional neural network (CNN).

FIG. 8 is a schematic representation of an example of a CNN. FIG. 8 illustrates an initial input image of an array of pixel values, followed by a number of convolutional layers that are in turn followed by a number of fully connected layers, the last of which provides the output. Each neuron in the first convolutional layer (Con 1) takes as input data from an n×n pixel sub-region of the input image. The neuron's learned weights, which are collectively referred to as its convolution filter, determine the neuron's single-valued output in response to the input. In the convolutional layers, a neuron's filter is applied to the input image by sliding the input region along the image's x and y dimensions to generate the values of the convolutional layer. In practice, the equivalent convolution is normally implemented by statically identical copies of the neuron to different input regions. The process is repeated through each of the convolutional layers (Con1 to Con N) using each layer's learned weights, after which it is propagated through the fully connected layers (L1 to LM) using their learned weights.

Figure 9:
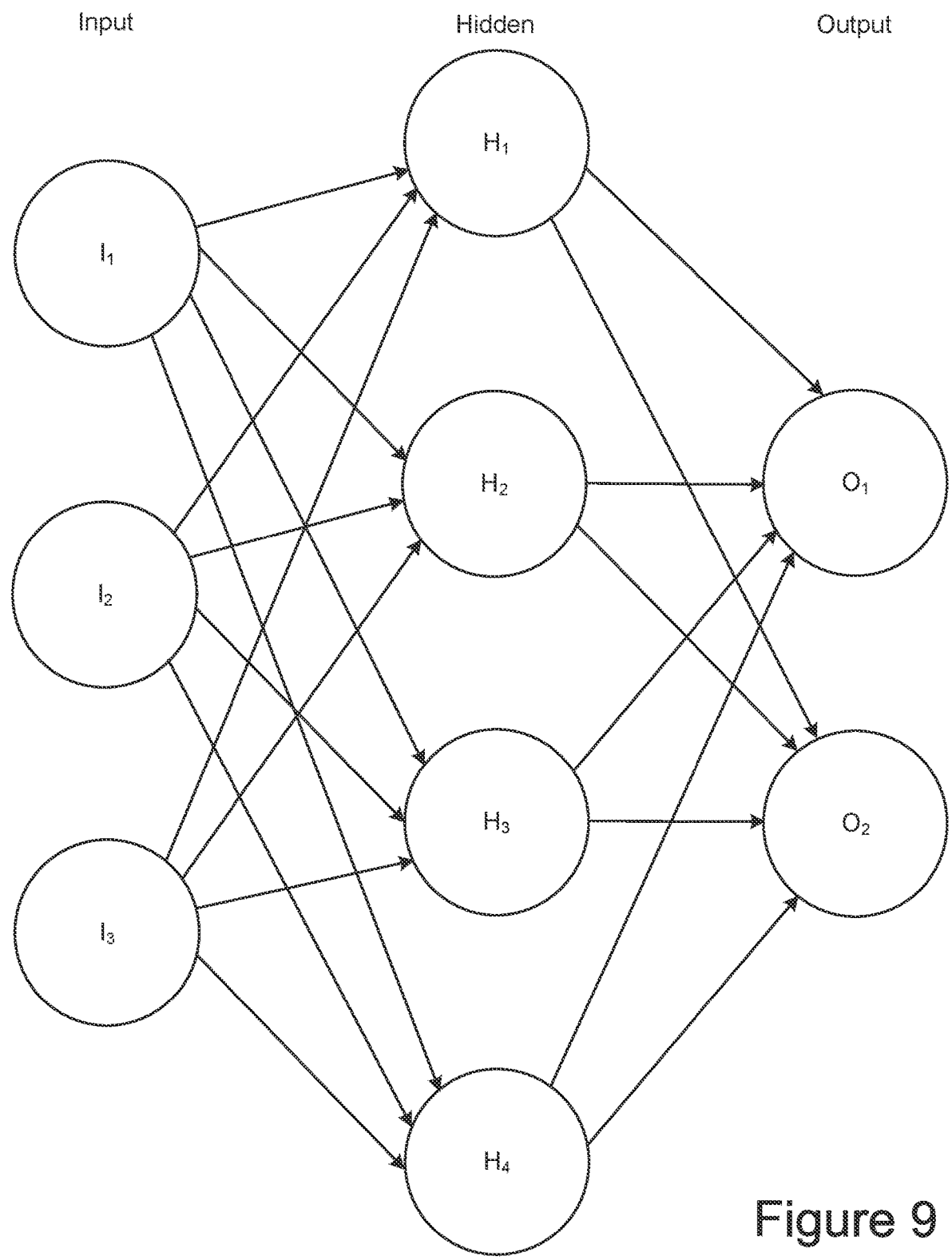
FIG. 9 illustrates a simple example of fully connected layers in an artificial neural network.

FIG. 9 represents several fully connected layers of a neural network in more detail. In FIG. 9, the shown three layers of the artificial neural network are represented as an interconnected group of nodes or artificial neurons, represented by the circles, and a set of connections from the output of one artificial neuron to the input of another. The example shows three input nodes ($I_1$, $I_2$, $I_3$) and two output nodes ($O_1$, $O_2$), with an intermediate layer of four hidden or intermediate nodes ($H_1$, $H_2$, $H_3$, $H_4$). The nodes, or artificial neurons/synapses, of the artificial neural network are implemented by logic elements of a host or other processing system as a mathematical function that receives one or more inputs and sums them to produce an output. Usually, each input is separately weighted and the sum is passed through the node's mathematical function to provide the node's output.

In common artificial neural network implementations, the signal at a connection between nodes (artificial neurons/synapses) is a real number, and the output of each artificial neuron is computed by some non-linear function of the sum of its inputs. Nodes and their connections typically have a that adjusts as a learning process proceeds. The weight increases or decreases the strength of the signal at a connection. Nodes may have a threshold such that the signal is only sent if the aggregate signal crosses that threshold. Typically, the nodes are aggregated into layers. Different layers may perform different kinds of transformations on their inputs. Signals travel from the first layer (the input layer) to the last layer (the output layer), possibly after traversing the layers multiple times. Although FIG. 8 shows only a single intermediate or hidden layer, a complex deep neural network (DNN) can have many such intermediate layers.

A supervised artificial neural network is "trained" by supplying inputs and then checking and correcting the outputs. For example, a neural network that is trained to recognize dog breeds will process a set of images and calculate the probability that the dog in an image is a certain breed. A user can review the results and select which probabilities the network should display (above a certain threshold, etc.) and return the proposed label. Each mathematical manipulation as such is considered a layer, and complex neural networks have many layers. Due to the depth provided by a large number of intermediate or hidden layers, neural networks can model complex non-linear relationships as they are trained.

Figure 10B:
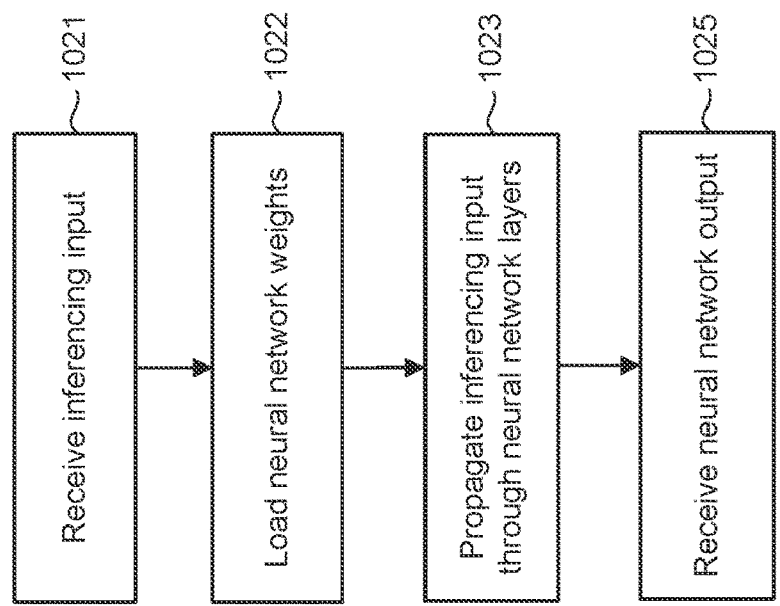
FIG. 10B is a flowchart describing one embodiment of a process for inference using a neural network.
Figure 10A:
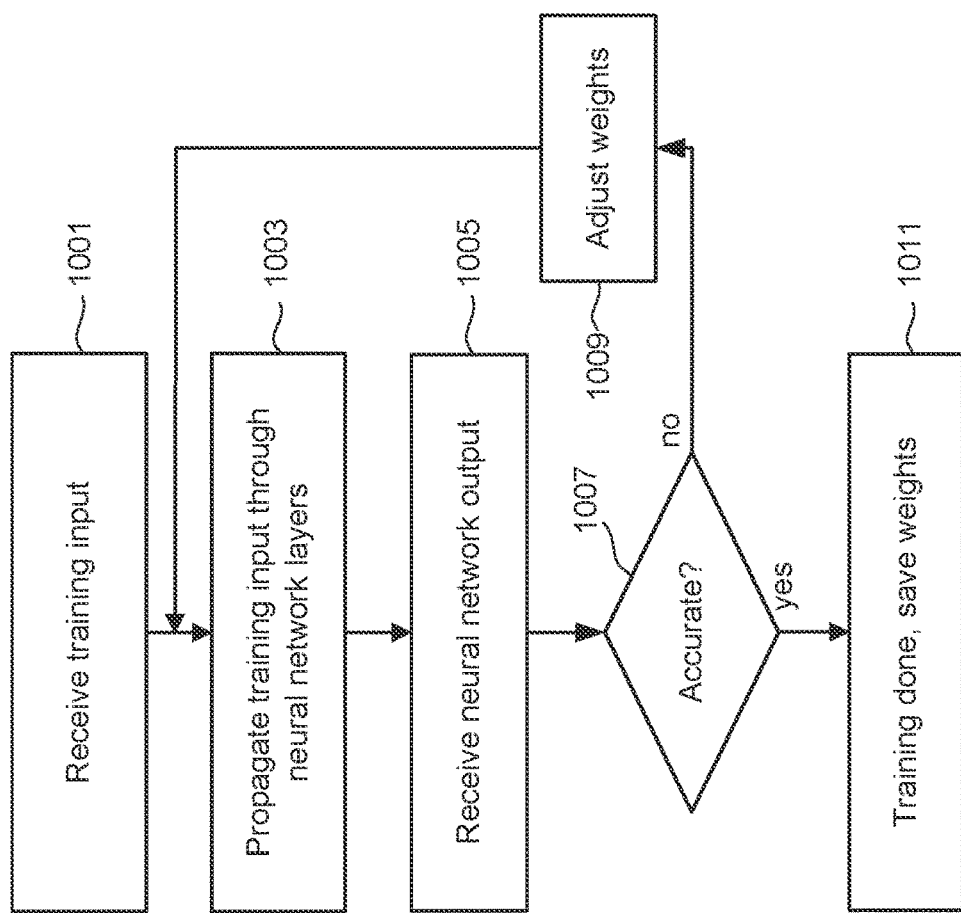
FIG. 10A is a flowchart describing one embodiment of a process for training a neural network to generate a set of weights.

FIG. 10A is a flowchart describing one embodiment of a process for training a neural network to generate a set of weights. The training process is often performed in the cloud, allowing additional or more powerful processing to be accessed. At step 1001, the input, such as a set of images, is received (e.g., the image input in FIG. 8). At step 1003 the input is propagated through the layers connecting the input to the next layer (e.g., CON1 in FIG. 8) using the current filter, or set of weights. The neural network's output is then received at the next layer (e.g., CON2 in FIG. 8) in step 1005, so that the values received as output from one layer serve as the input to the next layer. The inputs from the first layer are propagated in this way through all of the intermediate or hidden layers until they reach the output. In the dog breed example of the preceding paragraph, the input would be the image data of a number of dogs, and the intermediate layers use the current weight values to calculate the probability that the dog in an image is a certain breed, with the proposed dog breed label returned at step 1005. A user can then review the results at step 1007 to select which probabilities the neural network should return and decide whether the current set of weights supply a sufficiently accurate labelling and, if so, the training is complete (step 1011). If the result is not sufficiently accurate, the neural network adjusts the weights at step 1009 based on the probabilities the user selected, followed by looping back to step 1003 to run the input data again with the adjusted weights. Once the neural network's set of weights have been determined, they can be used to "inference," which is the process of using the determined weights to generate an output result from data input into the neural network. Once the weights are determined at step 1011, they can then be stored in non-volatile memory for later use, where the storage of these weights in non-volatile memory is discussed in further detail below.

FIG. 10B is a flowchart describing a process for the inference phase of supervised learning using a neural network to predict the "meaning" of the input data using an estimated accuracy. Depending on the case, the neural network may be inferenced both in the cloud and by an edge device's (e.g., smart phone, automobile process, hardware accelerator) processor. At step 1021, the input is received, such as the image of a dog in the example used above. If the previously determined weights are not present in the device running the neural network application, they are loaded at step 1022. For example, on a host processor executing the neural network, the weights could be read out of an SSD in which they are stored and loaded into RAM on the host device. At step 1023, the input data is then propagated through the neural network's layers. Step 1023 will be similar to step 1003 of FIG. 10B, but now using the weights established at the end of the training process at step 1011. After propagating the input through the intermediate layers, the output is then provided at step 1025.

Figure 11:
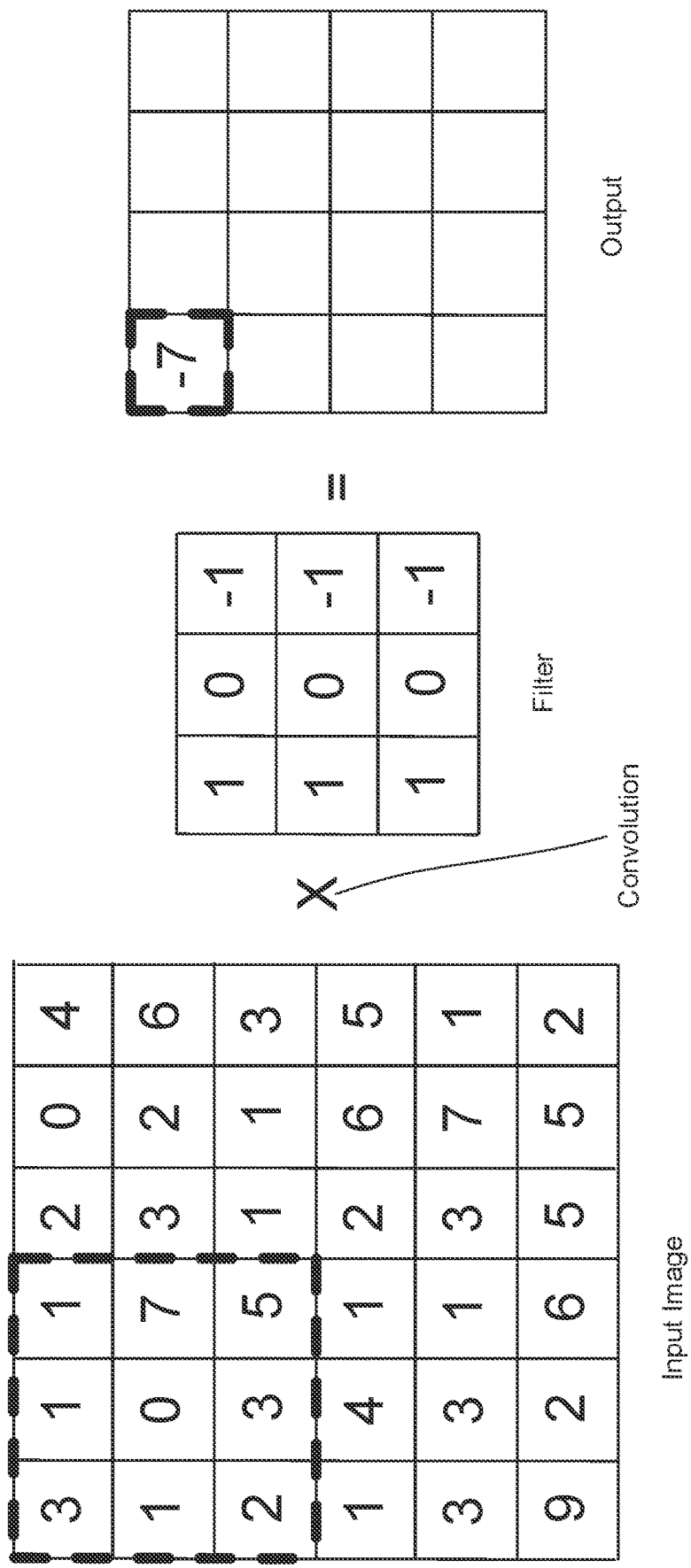
FIG. 11 is a schematic representation of a convolution operation in a convolutional neural network.

FIG. 11 is a schematic representation of a convolution operation between an input image and filter, or set of weights. In this example, the input image is a 6×6 array of pixel values and the filter is a 3×3 array of weights. The convolution operation is performed by a matrix multiplication of the 3×3 filter with 3×3 blocks of the input image. For example, the multiplication of the upper-left most 3×3 block of the image with the filter results in the top left value of the output matrix. The filter can then be slid across by one pixel on the image to generate the next entry of the output, and so on to generate a top row of 4 elements for the output. By repeating this by sliding the filter down a pixel at a time, the 4×4 output matrix is generated. Similar operations are performed for each of the layers. In a real CNN, the size of the data sets and the number of convolutions performed mean that extremely large numbers of such operations are performed involving very large amounts of data.

Figure 12:
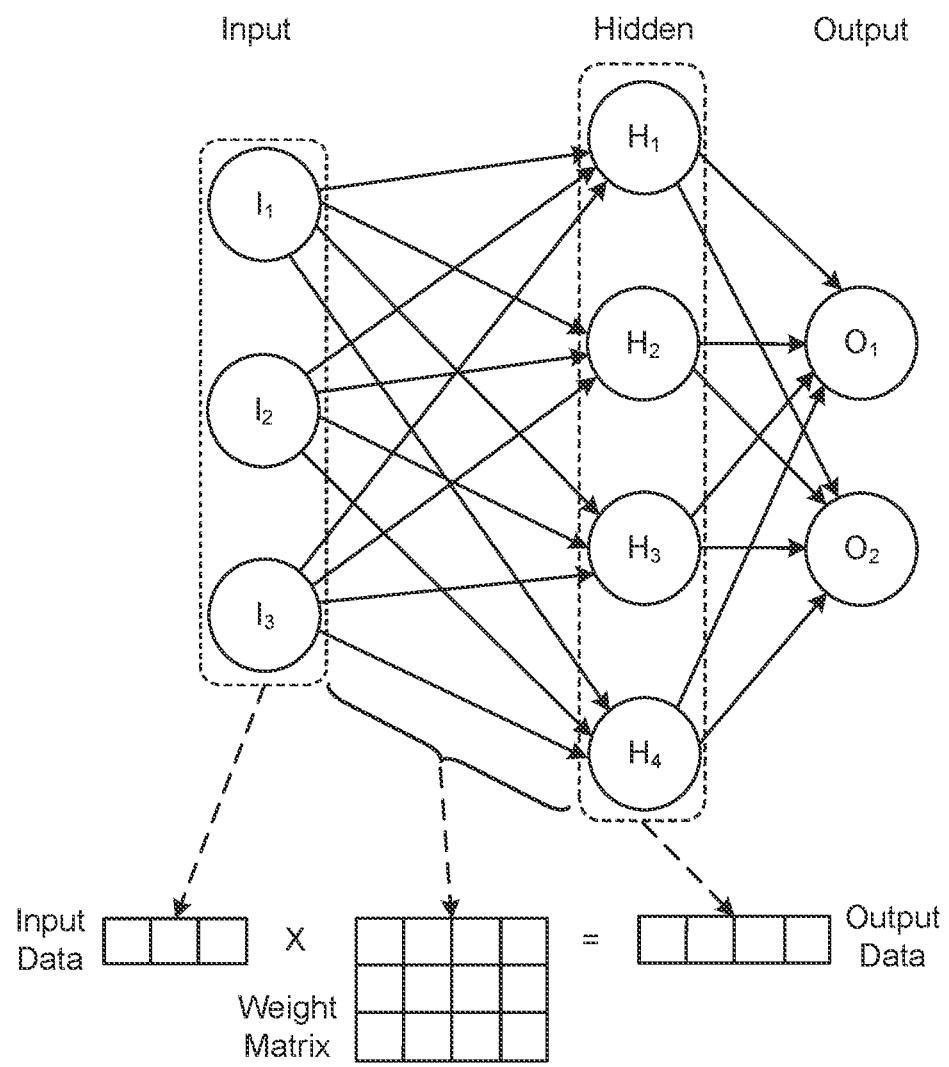
FIG. 12 is a schematic representation of the use of matrix multiplication in a fully connected layer of a neural network.

FIG. 12 is a schematic representation of the use of matrix multiplication in a fully connected layer of a neural network. Matrix multiplication, or MatMul, is a commonly used approach in both the training and inference phases for neural networks and is used in kernel methods for machine learning. FIG. 12 at the top is similar to FIG. 9, where only a single hidden layer is shown between the input layer and the output layer. The input data is represented as a vector of a length corresponding to the number of input nodes. The weights are represented in a weight matrix, where the number of columns corresponds to the number of intermediate nodes in the hidden layer and the number of rows corresponds to the number of input nodes. The output is determined by a matrix multiplication of the input vector and the weight matrix, where each element of the output vector is a dot product of the vector of the input data with a column of the weight matrix.

Another artificial intelligence application that involves multiplication of large matrices and/or large input vectors is for Generative Pre-trained Transformers (GPTs). A GPT is an autoregressive language model based on unsupervised machine learning. GPTs may be used to, for example, generate human-like text based on an input prompt. GPTs may have an extremely large number of parameters, thereby, requiring large matrices.

Figure 13:
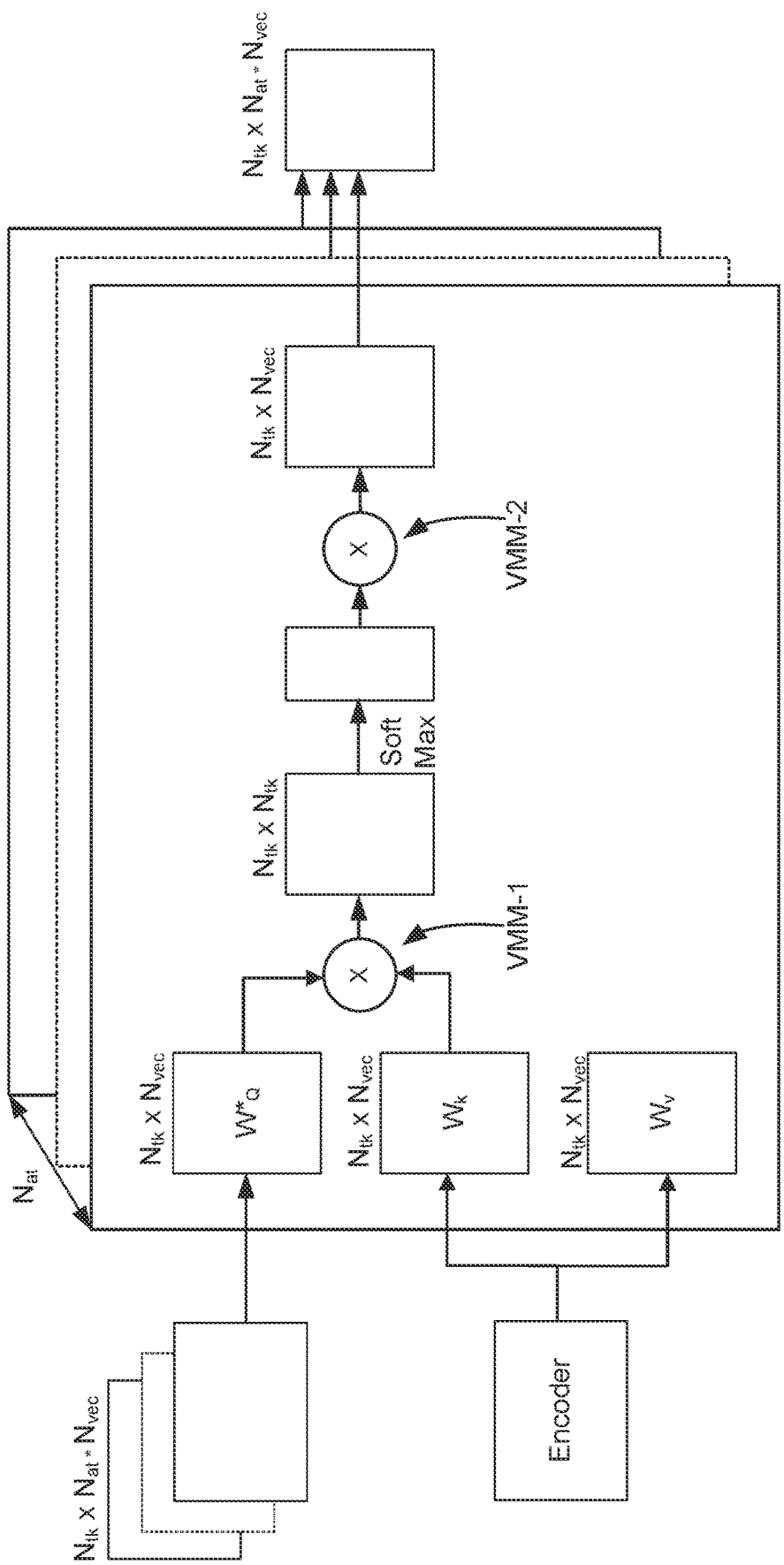
FIG. 13 depicts an example of a flow of computations in a generative pre-trained transformer (GPT).

FIG. 13 depicts an example of a flow of computations in a portion of a GPT, in which VMMs (vector-matrix multiplications) of an input vector and a weight matrix are performed for a multi-head attention units of GPT. The number of attention heads ($N_{at}$) can be quite large (on the order of a hundred, for example) and the weight matrices $W^*_Q$, $W_K$, and $W_V$ are of size $N_{tk} \times N_{VEC}$ can also be very large (on the order of thousands for $N_{tk}$, for example). At left, the inputs of are matrices of dimension $N_{tk} \times (N_{at}*N_{VEC})$ and also encoder inputs that are multiplied with the weight matrices. Following in the initially multiplications with the weights follow computations such ae VMM-1 and VMM-2, which have multiplications of between vectors and matrices of respective sizes $[1 \times N_{VEC}]*[N_{VEC} \times N_{tk}]$ and $[1 \times N_{tk}]*[N_{tk} \times N_{VEC}]$. As these structures tend to be very fully connected and the large weight matrices tend to not be sparse, the number and size of VMMs required for a GPT can be large even when compared to the CNNs and fully connected layers of neural networks described above.

To improve performance and energy efficiency, and reduce bandwidth limitations by eliminating the cost of data movement across memory hierarchies, the large number of multiplications involved in implementing neural networks can be done by CiM (Compute-in-memory) techniques using the non-volatile memory structures described above with respect to FIGS. 1-7F. These can be done using a number of memory technologies and architectures, but the type of 3D NAND architecture described in the following discussion can offer a number of advantages when implementing large vector-matrix multiplications for CiM.

Figure 14:
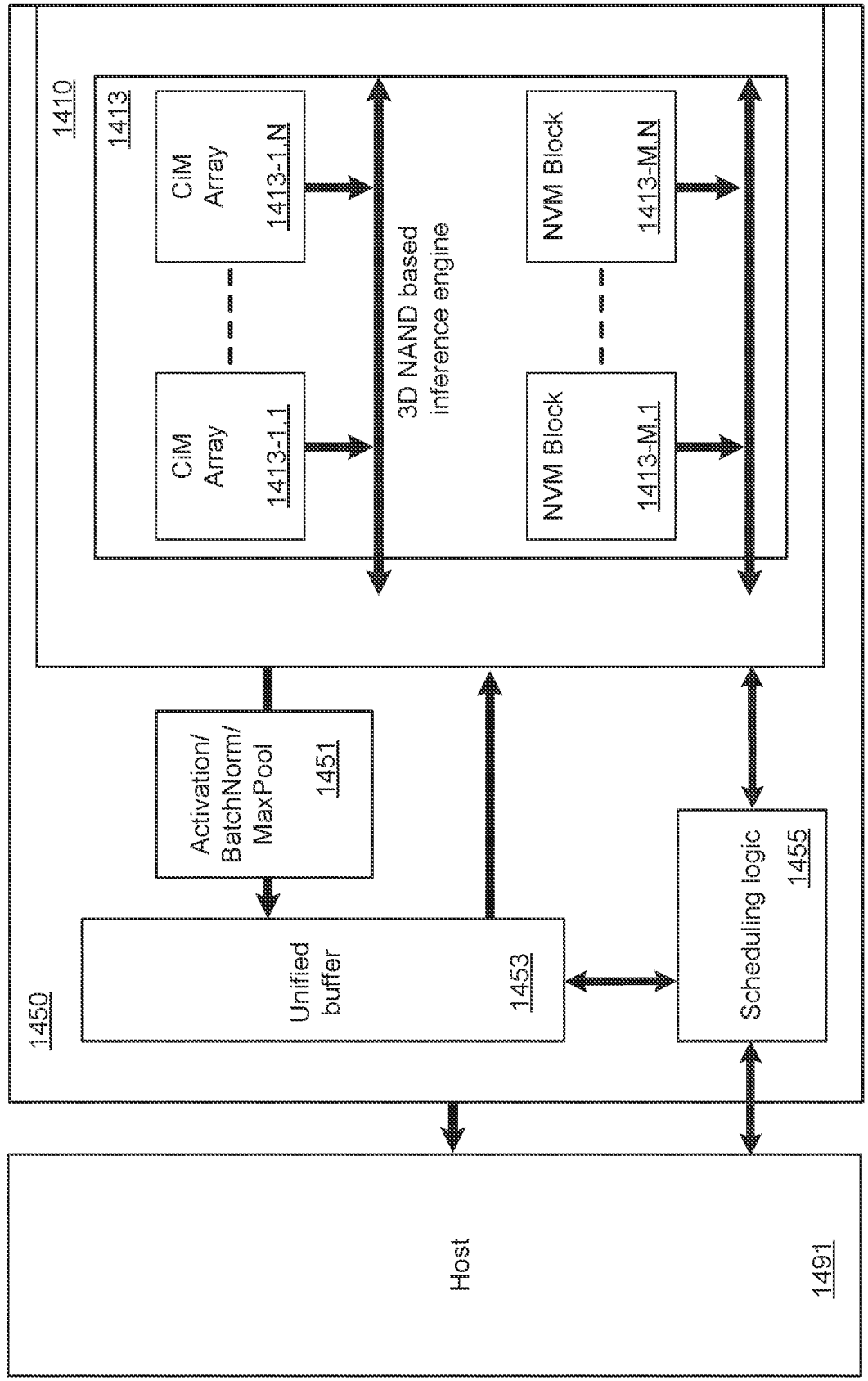
FIG. 14 is a block diagram of a high-level architecture of a compute in memory inference engine.

FIG. 14 is a block diagram of a high-level architecture of an embodiment for a compute in memory inference engine that provides context for the follow discussion. In FIG. 14, a non-volatile memory device 1450 includes a memory die 1410 of multiple memory blocks 1413 represented as M rows and N columns of arrays, including a general non-volatile memory portion, of which two blocks 1413-(M,1) and 1413-(M,N) are shown, and a (CIM) inference engine portion, of which two blocks 1413-(1,1) and 1413-(1,N) are shown. In the following, the CIM blocks are based on a 3D NAND architecture. The general usage NVM blocks can also be of a 3D NAND architecture or can be different, such as 3D NOR or storage class memory. Each of the CIM blocks of memory die 1410 can be operated to compute in-memory the multiply and accumulate operations of a vector-matrix multiplication as described below. The memory die 1410 of FIG. 14 only represents the memory blocks, but can also include additional peripheral/control elements of FIG. 5 or can be the memory die of a bonded die pair as in FIG. 6.

In addition to the one or more control circuits that generate the product values from the integrated circuit of memory die 1410, other elements on the memory device (such as on the controller 102) include a unified buffer 1453 that can buffer data being transferred from the host device 1491 to the memory die 1410 and also receive data from the memory die 1410 being transferred from to the host device 1491. For use in inferencing, neural network operations such as activation, batch normalization, and max pooling 1451 can be performed by processing on the controller for data from the memory die 1410 before it is passed on to the unified buffer 1453. Scheduling logic 1455 can oversee the inferencing operations.

In the embodiment of FIG. 14, the memory die 1410 is 3D NAND memory, but other embodiments can be based on other memory technologies. In the embodiment of FIG. 14, the memory die includes a number of memory blocks or sub-arrays 1413-i,j, some that are configured to operate as a CIM inference engine and others that can work as basic memory and can be employed, for examples, as buffers in a multiple layer neural network or a large neural network that cannot fit in a single memory device. The embodiment of FIG. 14 can be referred to as having inter-chip heterogenous functions. In alternate embodiments, an intra-chip heterogenous arrangement of multiple memory dies can be used, were some chips support CiM inference, while others are basic memory, or where the two variations can be combined.

A compute in memory approach to neural networks can have a number of advantages for machine learning applications operating in energy-limited systems. The weights are stationary stored in the arrays 1413 of the inference engine, thus eliminating unnecessary data movement from/to the host. The input data can be programmed by the host 1491 to access CIM arrays such as 1413-1,1 and 1413-1,N and computational logic can be replaced by memory cell access. The compute in memory inference engine can be integrated as accelerators to support machine learning applications in the larger memory system or for a host device (e.g., 1491). Additionally, the structure is highly scalable with model size.

Although a compute in memory neural network architecture allows for relatively efficient computations, neural networks can have many layers each with large weight matrices, requiring vary large numbers of weight values to be stored. Consequently, although compute in memory systems can greatly increase the efficiency of neural network operations, their efficiency can be further improved based on the memory technology used for CiM arrays. In particular, the following considers the use of 3D NAND architectures in which the memory cells are operated in the linear region and use weight level and input level expansion.

Figure 15:
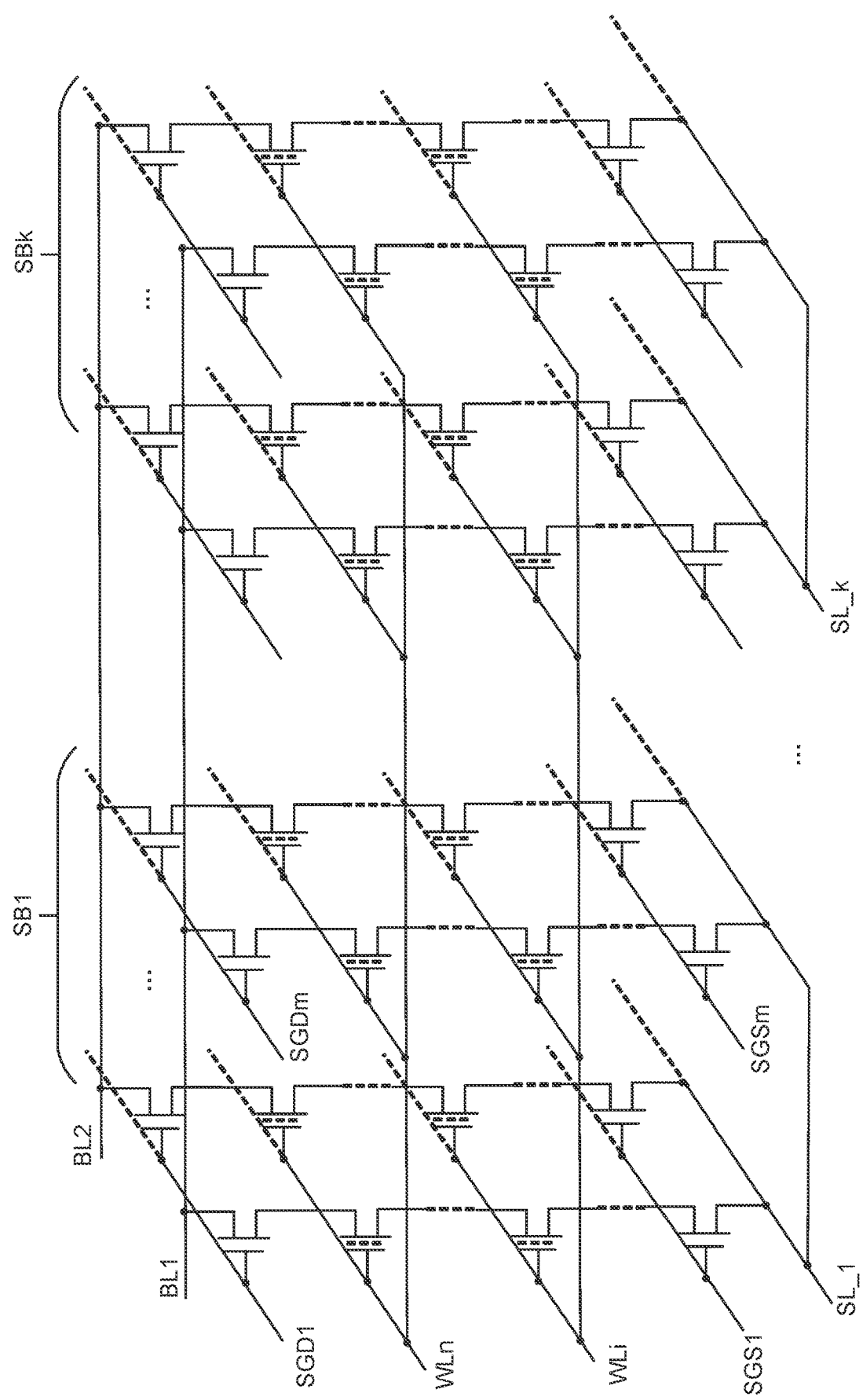
FIG. 15 is a schematic representation of an embodiment of a portion of a 3D NAND structure for implementing matrix multiplications.

FIG. 15 is a schematic representation of an embodiment of a portion of a 3D NAND structure for implementing matrix multiplications. Two sub-blocks SB1 and SBk are shown, where these can correspond to two of the regions 720, 730, 740 and 750 in the top of a 3D NAND array shown in FIG. 7C or two of the sub-blocks in FIG. 7F. Two bit lines BL1 and BL2 are shown, spanning the sub-blocks of the array from right to left, and two of to the word lines WLi and WLn are shown and connect to the corresponding memory cells of the NAND strings. Each the NAND strings is connected to a source line through a source side select gate connected to corresponding control line, such as SGS1 for the left most row of columns in SB1, and to one of the bit lines through a drain side select gate connected to corresponding control line, such as SGD1 for the left most row of columns in SB1. These elements can all be as described in more detail with respect to FIGS. 7A-7F.

In the embodiment of FIG. 15, each of the sub-blocks has a separate source line, such as SL_1 for SB1 and SL-k for SL_k. In the embodiments described in the following, sensing is performed on the source line, with the matrix multiplication being done at each of these separated source lines. Parallel computing in each sub-block can be implemented by concurrently turning on multiple, or even all, NAND strings in a plane. The bit line voltages serve as the input signals of a neural network. The selected word line bias and the threshold voltage Vt programmed into a corresponding NAND memory cell modulates the weights of the neural network. (The selects of selected NAND string are biased to be ON and unselected word lines are biased at a pass voltage Vpass in order to be in an ON state.) The product of the input values and weight values of a layer of the neural network are then obtained at each bit line, with the sum obtained at each source line by collecting the current of all of the NAND strings of a sub-block. Sequential word line by word line multiplication is performed by selecting the individual word lines one at a time.

The matrix multiplication algorithm is then:

$$I_{SL} = \Sigma_i W_i * V_{ds\_i}, \quad \text{(equation 1)}$$

where the inputs are encoded as the drain-source voltage $V_{ds\_i}$, on bit line i, $W_i$ is the weight value stored in the memory cell, and sum over the index i is over all of the NAND strings contributing to the current on a source line for a sub-block. Note that the topology of FIG. 15, where all of the NAND strings of a sub-block are connected to a shared source line, naturally computes this sum.

A NAND memory cell operates in the linear region when the gate voltage, $V_g$, applied by the word line is greater than the memory cells threshold, $V_g > V_t$, and the drain-source voltage is less than the overdrive voltage, $V_{ds} < (V_g - V_t)$. The weight values can be encoded as:

$$W_i = (W/L) * C_{ox} * \mu (V_g - V_{t\_i}), \quad \text{(equation 2)}$$

where μ is the charge-carrier effective mobility, is the gate width, is the gate length and $C_{ox}$ is the gate oxide capacitance per unit area. Consequently, the weight values are linear functions of the overdrive voltage $OD_i = (V_g - V_{t\_i})$.

In the encoding of equation 2, the weight level is determined by the NAND memory cell's I-V characteristics, where the larger swing of the linear region of the MOSFET based memory cell can help to create more weight levels. In the linear region, the transistor is turned on and a channel has been created which allows current between the drain and the source. In this region the MOSFET based memory cell operates like a resistor controlled by the gate voltage relative to both the source and drain voltages, so that the current from drain to source can be modelled as in equations 1 and 2. To allow for expansion of weight values beyond binary values, in the embodiments presented here the NAND memory cells are programmed into different threshold voltage levels and the overdrive voltage, $OD = (V_g - V_t) = (V_{WL} - V_t)$ is in the linear region. In this arrangement, the word line bias is lower than the highest threshold voltage level corresponding to a weight value, but higher than that of the other weight values. This is illustrated with respect to FIGS. 16 and 17.

Figures 16, 17:
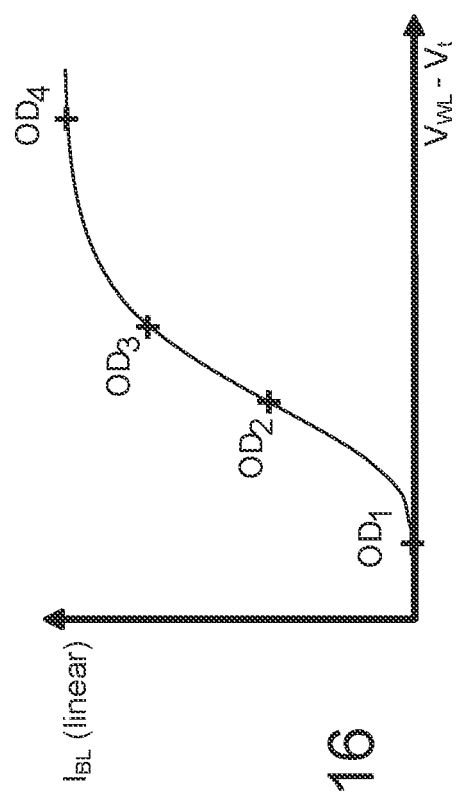
FIG. 16 illustrates the I-V behavior of a memory cell when operating in the linear region.
FIG. 17 is a table giving examples of values for the for the different weight values of FIG. 16.

FIG. 16 illustrates the I-V behavior of a memory cell when operating in the linear region, where the vertical axis is the bit line current $I_{BL}$ and the horizontal axis is the overdrive voltage $V_{WL} - V_t$. Four overdrive values are marked, where the lowest of $OD_1$ is in the OFF, or sub-threshold, mode and the highest of $OD_4$ is in the ON, or saturation, mode. In between are two states $OD_2$ and $OD_3$ in the linear mode. FIG. 16 illustrates four weight values, with two in the linear region, but more generally the number of weight values can be two or more, and can include an OFF state, an ON state, and additional states in the linear regions.

FIG. 17 is a table giving examples of values for the for the different weight values of FIG. 16. As illustrated on the top row, for $OD_1$ the memory cell is off, $OD_2$ and $OD_3$ are in the linear region, and for $OD_4$ the memory cell is on. The corresponding examples of overdrive values are under 0V for $OD_1$, 1V for $OD_2$, 1.5V for $OD_3$, and at least 2V for $OD_4$. If the word line voltage for selected memory cells is taken as $V_{WL} = 3V$, the different levels can be encoded in the memory cells by programming threshold voltages of $V_t = 4V$ for $OD_1$, $V_t$ 2V for $OD_2$, $V_t = 1.5V$ for $OD_3$, and $V_t = 0V$ for $OD_4$. The bottom row of FIG. 17 gives examples of the resultant bit line currents, where for $OD_1$ the current is only the leakage current $I_{BL} < 0.1$ nA, $I_{BL} = 40$ nA for $OD_2$, $I_{BL} = 90$ nA for $OD_3$, and for $OD_4$ the current is the ON state current of $I_{BL} = 140$ nA.

A multi-level expansion of weight values can be implemented by, for each weight value, combining the outputs from multiple NAND strings to create the different weight levels. In the 3D NAND configuration illustrated in FIG. 15, multiple NAND strings from a sub-block connect to the same bit line and, consequently, share the same input. Since these NAND strings of the same sub-block and connected to the same bit line also share the same source line, their current on the source line will be the combined current for this set of NAND strings. This set of multiple NAND strings within in the same sub-block can be used to represent one weight value by turning on all of the NAND strings of the sub-block concurrently. A first embodiment for this expansion can be illustrated with respect to FIGS. 18 and 19.

Figures 18, 19:
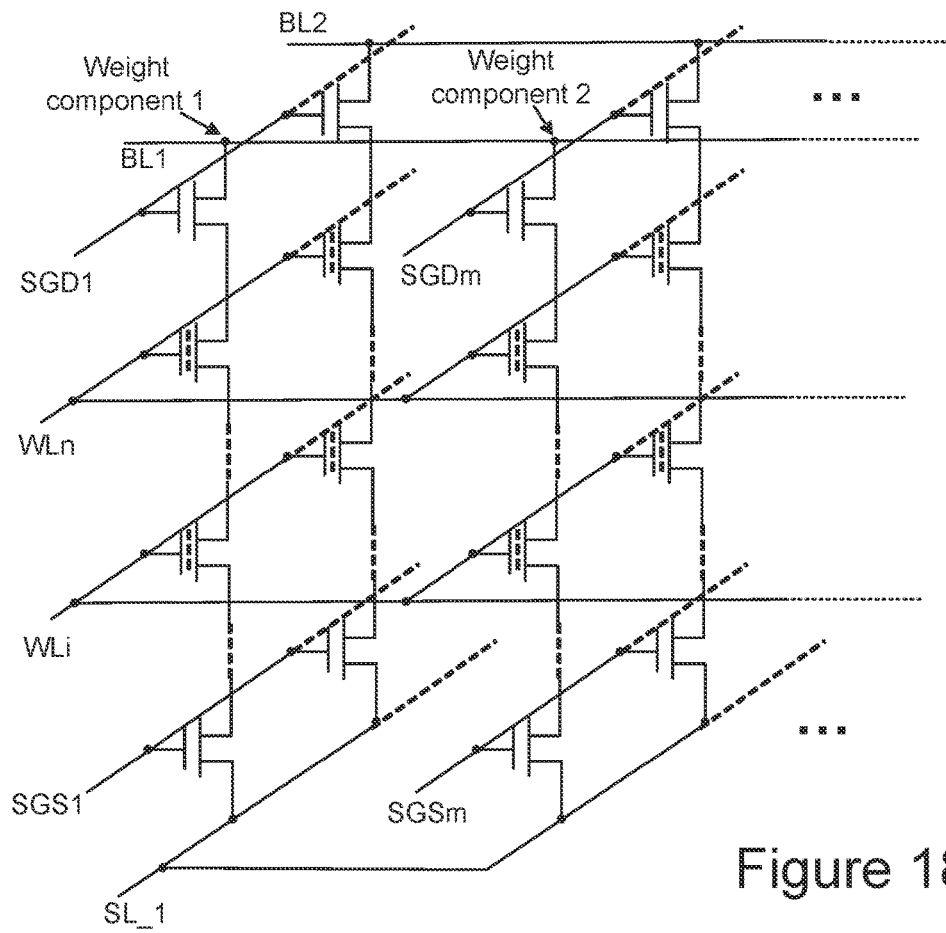
FIG. 18 shows a portion of a NAND array to illustrate the storage of different components of a neural network's weight values on different NAND strings along the same bit line and connected to the same source line.
FIG. 19 is a table for one embodiment of values for weight level generation in a four level example.

FIG. 18 shows a portion of a NAND array to illustrate the storage of a multi-bit value of a neural network's weight on different NAND strings along the same bit line and connected to the same source line. FIG. 18 shows a portion of a sub-block with two bit lines BL1 and BL2, each with two NAND strings, where all of the NAND strings of the sub-block are connected to the source line SL_1. The components of a weight are stored in the different NAND strings along the same bit line, such as storing weight component 1 in the left most NAND string along BL1, weight component 2 in the second NAND string along BL1, and so on for the other weight bits and NAND strings along BL1. To store the weight's values, the memory cells along the NAND cells along the shared bit lines are programmed to one of multiple $V_t$ levels, where the different combinations of the multiple NAND string $V_t$ values will for correspond to different weight levels, with the combined weight level being the sum of the contributions from the different NAND strings along the bit line.

FIG. 19 is a table for one embodiment of values for weight level generation in an example where each weight component can be one of four levels. The table of FIG. 19 is organized as in FIG. 17, but the columns now correspond to weight component level 1, weight component level 2, weight component level 3, and weight component level 4. Weight component level 1 and weight component level 4 are respectively in an OFF and an ON state and these columns have the same values as in FIG. 17. Weight bit 2 and weight bit 3 are in the linear region, but have different overdrive voltage values than the corresponding columns of FIG. 17 so that the summed current on the source line provide the correct output value. In this embodiment, a word line voltage of $V_{WL}$=3V is again used for the selected word line, where the non-selected word lines receive a higher pass voltage $V_{pass}$ so that the non-selected memory cells of the NAND strings will in an ON state independent of their $V_t$ values, with the select gates also ON. Weight component level 2 has an overdrive voltage of 0.6V, corresponding to a $V_t$=0.6V and a current of $I_{BL}$=6 nA, and weight component level 3 has an overdrive voltage of 0.95V, corresponding to a $V_t$=2.05V and a current of $I_{BL}$=29 nA. This encoding of the bits of a weight level is based on the programming of different threshold voltage levels $V_t$ ($V_{t\_1}$, $V_{t\_2}$, $V_{t\_i}$, ... $V_{t\_n}$) for the weight components into different NAND strings connected to the same bit line of a sub-block, with $I_{component\_i}$>max($I_{component\_1}$, $I_{component\_2}$, . . . , $I_{component\_(i-1)}$)*i, where $I_{component\_i}$ is the current contribution of the NAND string storing the weight component. One weight value is then represented by n NAND strings to create a weight with a total $2^n$ weight levels.

The number of weight bit values that can be fit into the linear region of operation for a memory cell (i.e., weight component level 2 and weight component level 3 in the table of FIG. 19) is limited by the NAND memory cells' characteristics. In one set of embodiments, the number of bits available for weight level expansion can be expanded by combining multiple NAND strings for the generation of weight bits. More specifically, memory cells from multiple NAND strings connected to the same bit line and on the same word line can be used to represent one weight component level, where the weight component level is a sum of the contributions of the combined memory cells. This can be illustrated with respect to FIGS. 20 and 21.

Figure 20:
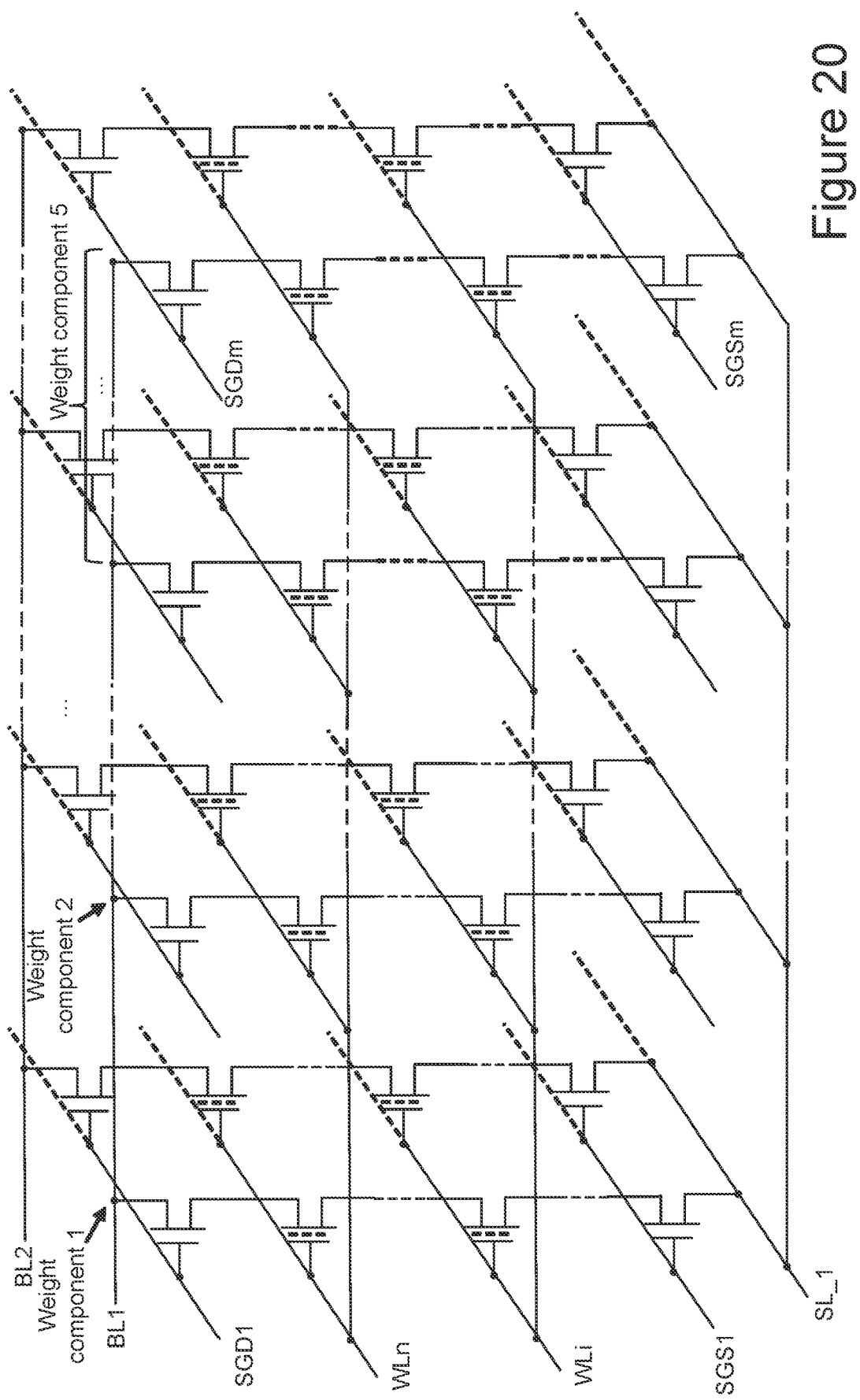
FIG. 20 shows a portion of a NAND array to illustrate the storage components of a neural network's weight values on multiple NAND strings along the same bit line and connected to the same source line.

FIG. 20 shows a portion of a NAND array to illustrate the storage of a component of a neural network's weight value on multiple NAND strings along the same bit line and connected to the same source line. In particular, the portion of a sub-block shown in FIG. 20 can be the same as shown in FIG. 18, but where additional NAND strings are shown along each of bit lines BL1 and BL2. Along BL1, weight component 1 and weight component 2 are again stored in the first two NAND strings along BL1, where weight component 3 and weight component 4 can again be stored in the next two (not shown) NAND strings along BL1. To store additional components, multiple NAND strings can be combined as illustrated for weight component 5. In FIG. 20, only two of the combined NAND strings storing weight component 5 are explicitly shown, but this can be more than two depending on the embodiment, such as the use of five NAND string in the example of FIG. 21.

Figures 21, 22, 23:
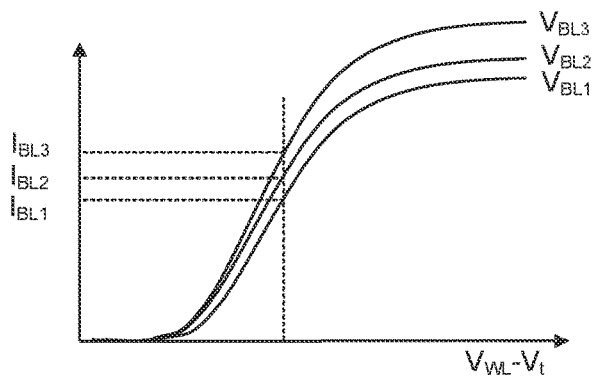
FIG. 21 is a table for one embodiment of values for weight level generation in a five level example.
FIG. 22 illustrates the I-V behavior of a NAND memory cell in the linear region for different bit line voltage levels.
FIG. 23 is a table of examples of bit line currents for different bit line voltages to illustrate the use of the linear region to encode different input values.

FIG. 21 is a table for one embodiment of values for weight level generation in a 5 component level example. For weight level component 1, weight level component 2, weight level component 3, and weight level component 4, FIG. 21 is the same as for the table of FIG. 19. For weight level component 5, a combination of four NAND stings configured as weight level component 4 and one NAND string configured as weight level component 2 are combined, creating a weight level component 5 value for a total of 32 weight levels from nine NAND string along the same bit line. Additional bit levels can similarly be created through additional multi-NAND string configurations: for n1 non-combined bits, each bit is represented by a memory cell on one NAND string; for n2 combined bits, each bit is represented by a memory cell on each of a number $m_i$>1 of NAND string, with $I_{component\_i}$(non-combined and combined total)>max ($I_{component\_1}$, $I_{component\_2}$, . . . , $I_{component\_(i-1)}$)*i, where $I_{component\_i}$ is again the current contribution of the NAND string or strings storing the weight component. This will create an n-bit weight value, for a total of 2n weight levels, with one weight represented by n=n1+$\Sigma_1^{n2}$ $m_i$ NAND strings.

As described above with respect to FIGS. 15-21, the weight values of a neural network can be expanded to encode multi-bit values by exploiting the I-V characteristics of the linear region of NAND memory cells to store different bit values on different NAND strings connected along a common bit line. An expansion of input values for a neural network to multi-bit values can implemented by encoding different component values for the input as input levels on different word lines, also by exploiting the properties of NAND memory cells operating in the linear region.

FIG. 22 illustrates the I-V behavior of a NAND memory cell in the linear region for different bit line (i.e., Vas) voltage levels. As in FIG. 16, the vertical axis of FIG. 22 is the current on the bit line of a memory in response to the overdrive voltage as plotted on the horizontal axis, but now the I-V curve is shown for several different bit line voltages, $V_{BL1}$, $V_{BL2}$, and $V_{BL3}$. Although curves have the same general form, a higher the bit line voltage results in a higher curve so that, for the same ($V_{WL}$-$V_t$) value, a higher bit line voltage results in a higher bit line current, so that $I_{BL3}$>$I_{BL2}$>$I_{BL1}$. This property allows for the input levels to encoded as bit line bias level as determined by the NAND memory cell's I-V characteristics. Additionally, the larger bit line bias's influence on the linear region's current can help to create additional levels.

FIG. 23 is a table of examples of bit line currents for different bit line voltages to illustrate the use of the linear region to encode different input values. In the table of FIG.

23, all of the values have the same overdrive voltage ($V_{WL}-V_t$), but use a different bit line voltage value. In this example, bit line voltage 1 is for a $V_{BL}=0.15V$ resulting in $I_{BL}=24$ nA, bit line voltage 2 is for a $V_{BL}=0.25V$ resulting in $I_{BL}=40$ nA, bit line voltage 3 is for a $V_{BL}=0.35V$ resulting in $I_{BL}=56$ nA, and bit line voltage 4 is for a $V_{BL}=0.45V$ resulting in $I_{BL}=72$ nA. Consequently, an input level expansion can use a different bit line bias level on different bit lines of a sub-block, with each of the bit lines representing a component of an input signal. To differentiate the different input levels, the difference in bit line biases should be large enough to distinguish the resultant current differences.

In a multi-level input expansion, different input levels are created by combing the outputs of multiple bit lines whose NAND string are connected to a shared source line. Each of the bit lines line corresponds to one of the input component values, where the memory cells of the NAND strings along each of these multiple bit lines are programmed to duplicate the components of multi-level weight values. The combined input levels of the multiple bit line components applied to the multiple NAND string along the multiple bit lines generate currents that are combined on the shared source line determine the multiplication of the multi-bit input values with the multi-bit weight values. This is illustrated by FIGS. 24 and 25.

Figure 24:
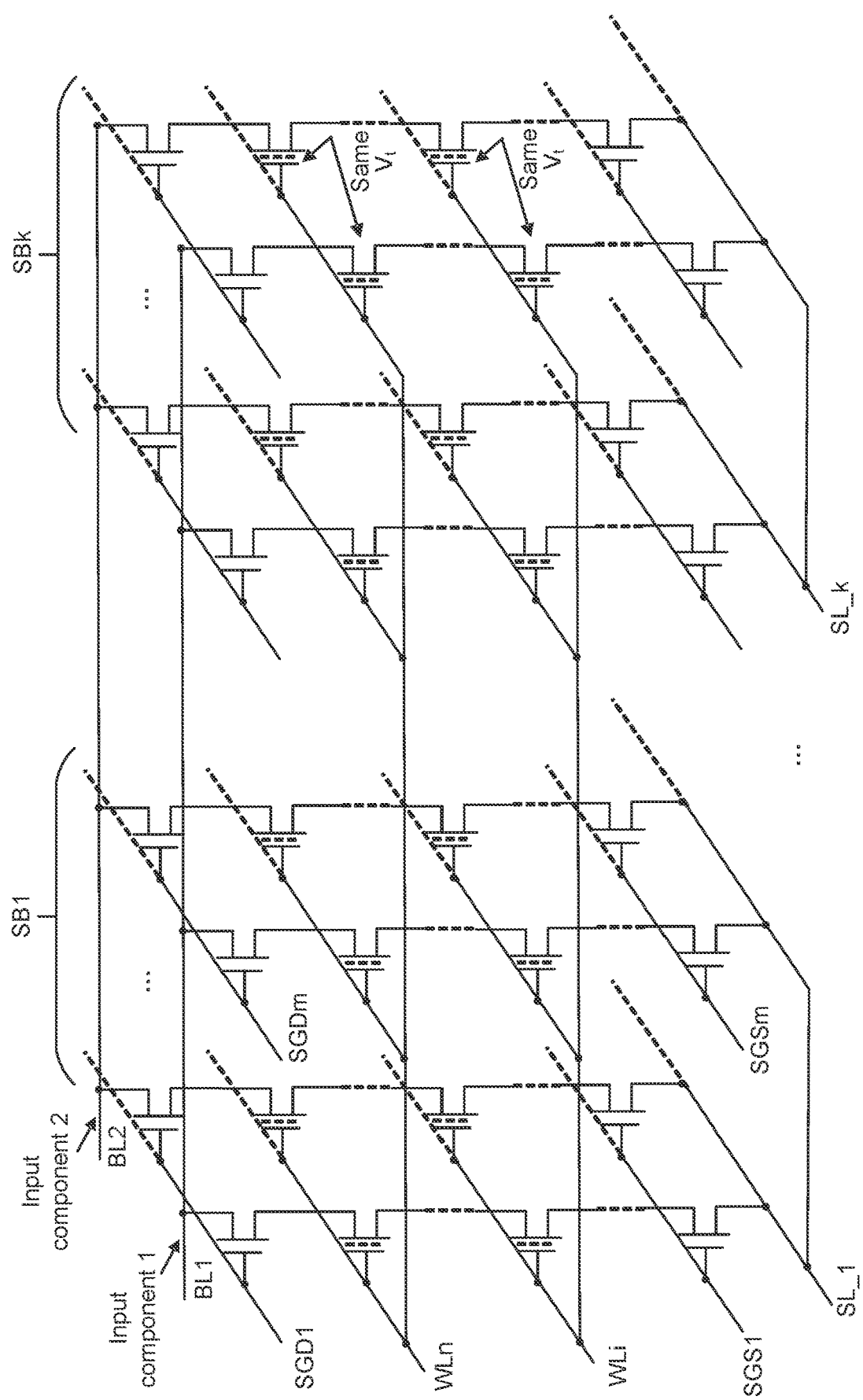
FIG. 24 illustrates the application of different bit of an input value to different bit lines of a portion of a sub-block of a 3D NAND array.

FIG. 24 illustrates the application of different bit of an input to multiple different bit lines of a portion of a sub-block of a 3D NAND array. FIG. 24 repeats the elements of FIG. 15 as described above, with two bit lines (BL1, BL2) and two sub-blocks (SL_1, SL_k), and two NAND strings (e.g., between SGD1/SGS and between SGDm/SGSm) along each bit line of each sub-block, explicitly shown. As illustrated in FIG. 24, an input is encoded as multiple components with the different components of the input applied to different bit lines, with the input component 1 bias value applied to BL1, the input component 2 bias value applied to BL2, and so on for the other input component values being applied to the other bit lines not represented in FIG. 24. Each of the components of the weight values are encoded as threshold values of each of the sub-blocks as described above with respect to FIGS. 18-21. As the weight bit values are repeated along each of the bit lines for the different input bit value' bit lines, corresponding memory cells along different bit lines will be programmed to the threshold voltage $V_t$, as illustrated at far right of FIG. 24 on word line WLn and WLi. The creation of input level can be based on assigning the bit values to bit lines as the set of bit line bias levels ($V_{BL\_1}, V_{BL\_2} \ldots V_{BL\_i} \ldots V_{BL\_n}$) to n bit lines, where the bias levels are arranged as $V_{BL\_i}>\max(V_{BL\_1}, V_{BL\_2} \ldots V_{BL\_i-1})*i$. This allows one n-bit input value to be encoded into n bit line inputs, for a total of $2^i$ input levels.

FIG. 25 is a table of bit line bias values and corresponding bit line current values for a 4 level input component embodiment. In this example, the four bit line bias levels are $V_{BL}=0.05V$, 0.11V, 0.34V, and 1.46V, with the corresponding bit line current values of $I_{BL}=8$ nA, 17.6 nA, 54.4 nA, and 234 nA. These four inputs to four bit lines can provide for 16 input levels.

Under the arrangement described above with respect to FIGS. 22-25, the number of input component levels that can be encoded onto the corresponding set of bit lines is limited by the characteristics of a NAND memory cell. To further expand the number of input component levels, higher levels can be implemented by using multiple bit lines to represent one level, where the extended level corresponds to the sum of the current from the multiple bit lines. This is illustrated with respect to FIGS. 26 and 27.

Figure 26:
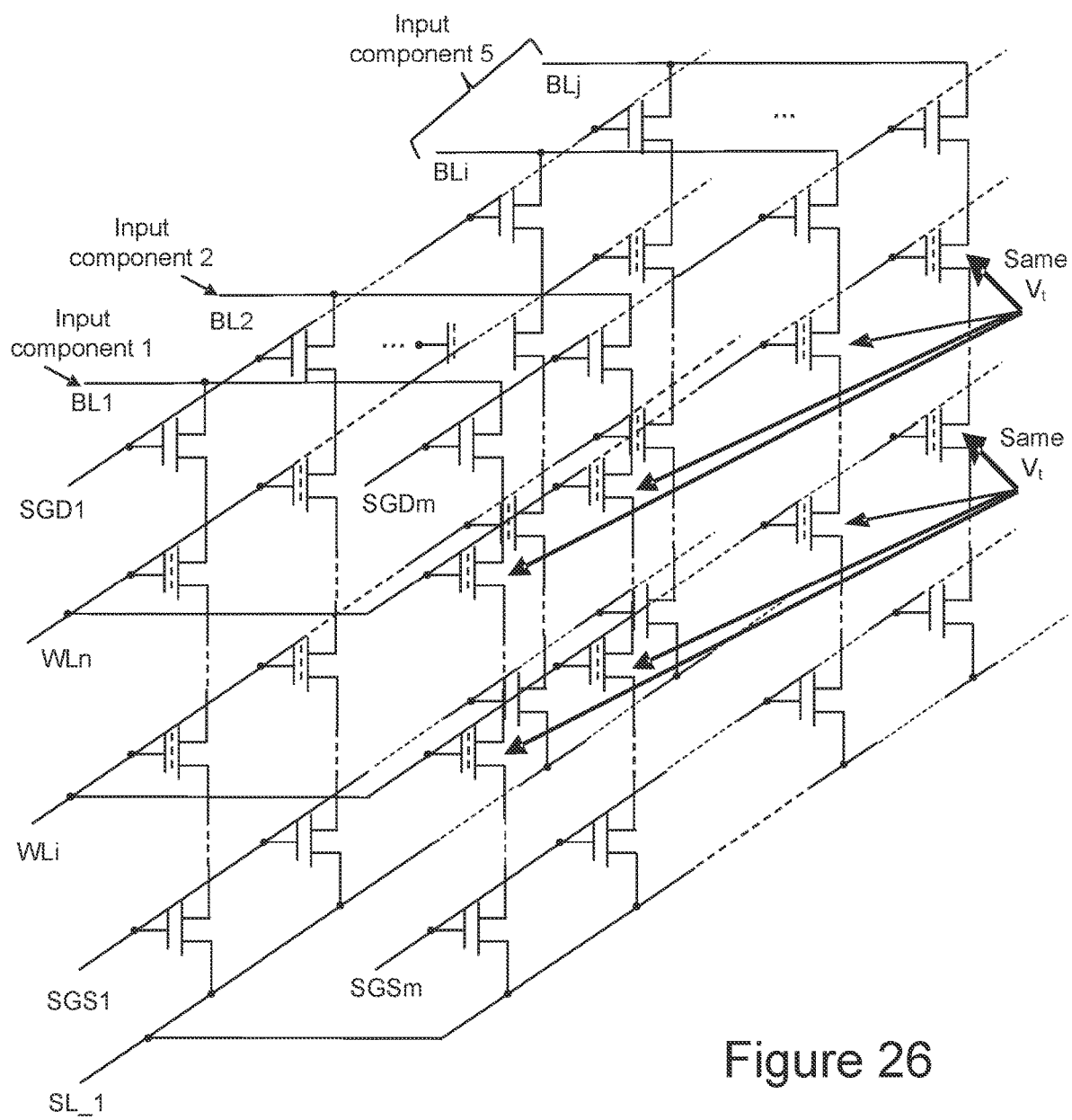
FIG. 26 shows a portion of a NAND array to illustrate the storage of a bit of a neural network's input values on multiple NAND strings along the same select gate line and connected to the same source line.

FIG. 26 shows a portion of a NAND array to illustrate the storage of components of a neural network's input values on multiple NAND strings along the same select gate line and connected to the same source line. The view of FIG. 26 shows a portion of a sub-block similar to that of FIG. 18, but extended to shown additional bit lines. Two rows of columns of NAND strings are shown connected to the bit lines, a first column of NAND string connected between drain side select gates along SGD1 and source side select gates along SGS1 and a second column of NAND string connected between drain side select gates along SGDm and source side select gates along SGSm. As in FIG. 24, input component level 1 and input component 2 are respectively applied as voltage levels to BL1 and BL2, with input component level 3 and input component level 4 similarly applied as voltage to levels to a BL3 and BL4 not shown in FIG. 26. In this embodiment, input component levels 1-4 of an input value are each applied to a single bit line, but other embodiments may store different numbers of input component levels in this way, where the number component levels can be based on the characteristics of the NAND memory cells as discussed above with respect to FIGS. 24 and 25. To further expand the input values to more bits, an individual input component can be encoded as inputs to a set of multiple bit lines. For example, in FIG. 26 input component level 5 is applied to a set multiple bit lines, including BLi and BLj, as a corresponding set of bit line voltages. For each of the rows of columns of NAND string connected between the same select gates, the weight value levels encoded as threshold voltages will be the same as component levels of the input values are currently applied on multiple bit lines to the component levels of the weight values stored along the column multiple NAND strings, with the product of the multiplication corresponding to the resultant current on the source line SL_1.

FIG. 27 is a table of bias line bias values and corresponding bit line current values for a 5 level input embodiment, where the fifth level uses multiple bit lines. In this embodiment, for input component levels 1-4, these are encoded as inputs to single bit lines using single bits lines with the same bit line voltage levels and resultant bit line current values as in the four input level embodiment illustrated in the table of FIG. 25. To generate a fifth input component level, five bit lines are combined, with four biased as for input level 4 and one bit line biased as for level one. This generates a combined bit line current of 944 nA. Additional input component levels can be similarly generated by combining multiple bit lines using bias levels as in input component levels 1-4. More generally, the input component levels can be created as n1 non-combined components (i.e., where each bit line represents a single input component level) and n2 combined inputs that use $m_i$ bit lines to represent one input component level. For all of the input component levels, the bit line voltages $V_{BL\_i}$ for input level i are arranged, for both non-combined and combined input levels, as $V_{BL\_i}>\max(V_{BL\_1}, V_{BL\_2} \ldots V_{BL\_i-1})*i$. This allows one n-bit input value, corresponding to a total $2^n$ input levels, to be encoded as $n=n1+\Sigma_1^{n2} m_i$ bit lines.

Figure 28:
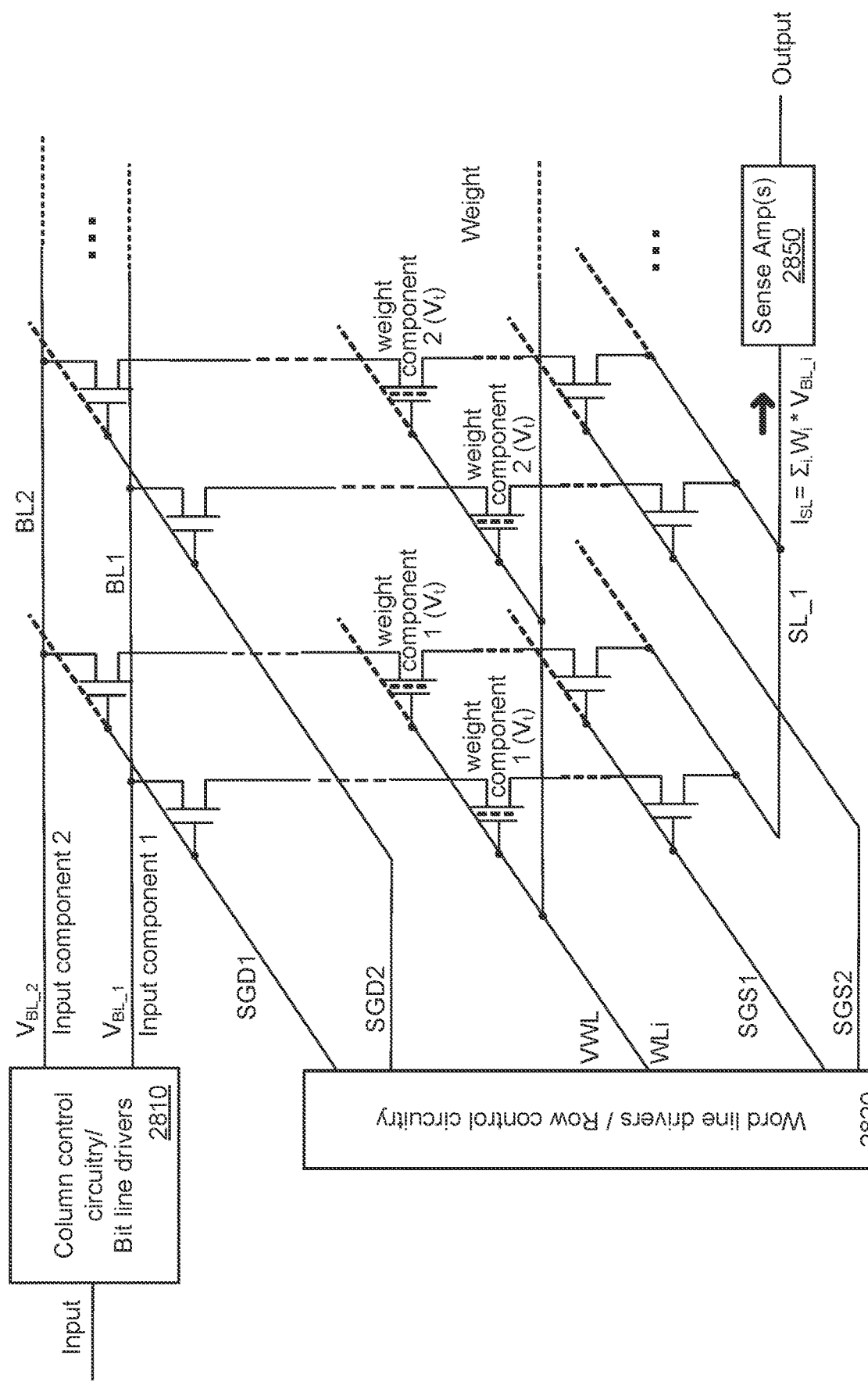
FIG. 28 illustrates an example of multi-level weight component values combined with multi-level input values.

As discussed above, embodiments for a multi-level weight expansion were described above with respect to FIGS. 16-21 and embodiments for a multi-level input expansion were above described with respect to FIGS. 22-27. These expansions can be used independently for implementing compute in memory operations for a neural network, where the number of bits for the weight expansion and the input expansion can be the same or different. For example, binary weights can be used with multi-level inputs and vice versa, although these can both have expanded values, such as having the same level of precision. FIG. 28 illustrates an example of multi-bit weight values combined with multi-bit input values.

FIG. 28 shows one word line of a 2×2 portion of a NAND array, with two bit-lines BL1 and BL2 (corresponding to two components of an input value) and two pairs of select lines SGD1/SGS1 and SGD2/SGS2 (corresponding to two components of a weight value). Only a single word line (WLi) is shown, corresponding to the selected word line that is biased to the VWL value of the tables above, where the other non-selected (and not shown) word lines are biased to a pass voltage and the select gates are biased to be ON. In an inference operation the weights can be stored on multiple layers in the 3D NAND structure of word lines that are read sequentially, where in the case that the weight values belong to the same neural network layer the outputs of the individual word lines' layer outputs can be accumulated.

For the word line layer WLi, input component 1 and input component 2 of an input for the neural network layer are respectively applied to bit lines BL1 and Bl2, with other components applied to their corresponding bit lines as bias voltage levels as described above. The weights of the neural network layers are stored on the WLi word line layer by programming a first weight component into the memory cells of the span of bit lines along the NAND string between SGD1 and SGS1, a second weight component into the memory cells of the span of bit lines along the NAND string between SGD2 and SGS2, and so on for the higher components of the weight value. The word line drivers and row control circuitry 2720 to bias the word lines and select gate lines can correspond to 520/620 of FIGS. 5 and 6. The column control circuitry, including bit line drivers, 2710 that biases the bit lines can correspond to elements of 510/610 of FIGS. 5 and 6. The cumulative current $I_{SL}$ on the source line is the combined current from NAND strings and corresponds to the sum of the products of the weight values, stored as threshold voltages, and the inputs, encodes as bit line voltages. The combined current can be measured by the sense amplifier or amplifier 2750, which can correspond to the sense amplifier circuits 550/650 of FIGS. 5 and 6, and is the output for the multiplication and can be converted to a digital value by an analog to digital converter to be part of the input to a subsequent layer of the neural network or, for a final layer, of the final output. Although only the contributions of components for both the input value and weight value are explicitly shown in FIG. 27, additional components for each can be incorporated as described above. 3D NAND memory arrays can be very large, both in the vertical and horizontal directions, so that although FIG. 27 represents only one word line layer and only a limited number of NAND strings storing the components of a single weight value, a single word line layer can store a large number on weight values for layer and also weight values for other layers spread across the array.

Figure 29:
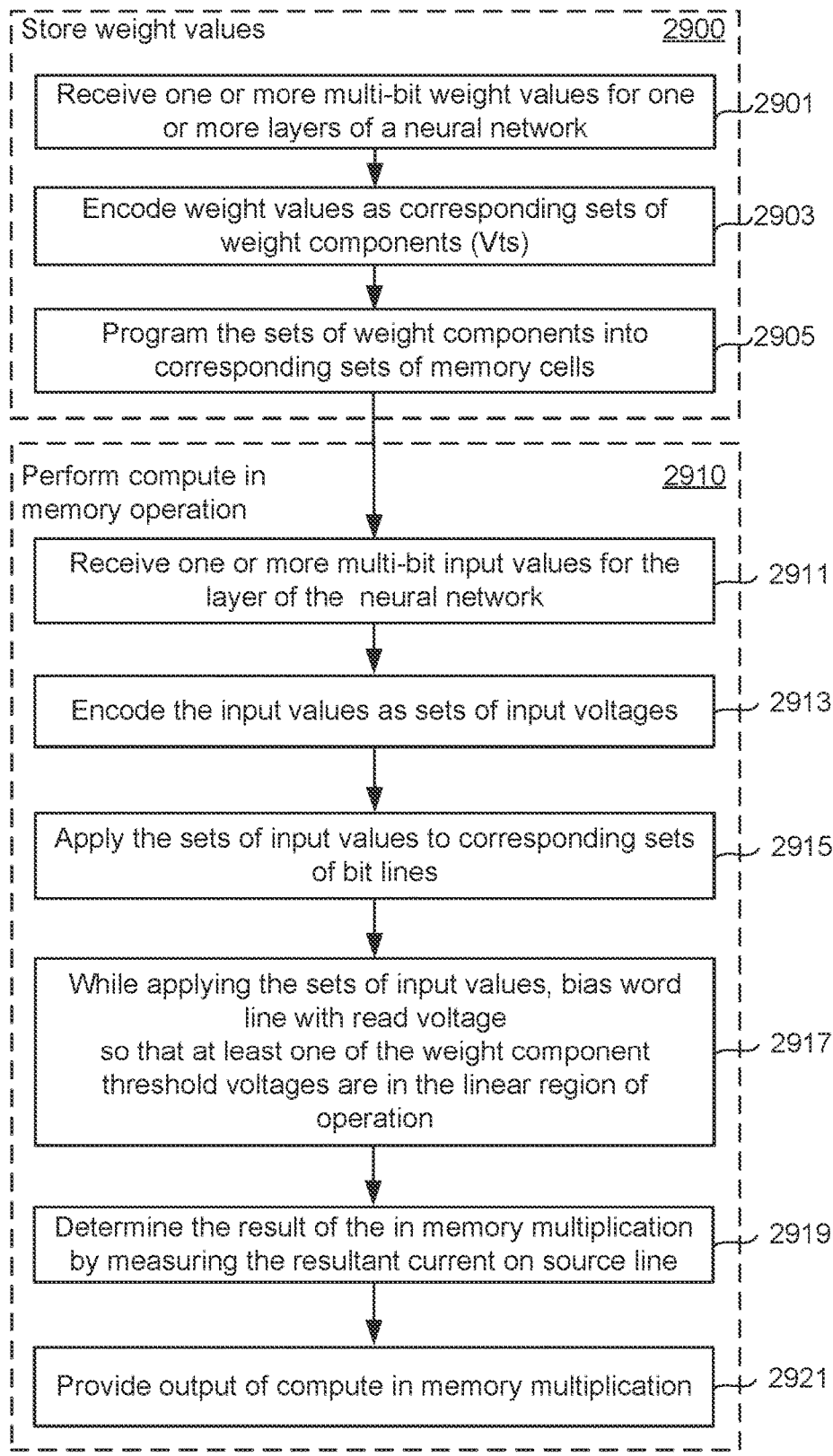
FIG. 29 is a flowchart for one embodiment of performing compute in memory operations for a neural network using a three dimensional NAND memory using expanded weight and input values in which the weight value bits are encoded as threshold voltage values and the input value bits are encoded as bit line voltages.

FIG. 29 is a flowchart for one embodiment of performing compute in memory operations for a neural network using a three dimensional NAND memory with expanded weight and input values in which the weight value bits are encoded as threshold voltage values and the input value bits are encoded as bit line voltages. The flow includes both the storing of the weights of a neural network in the step 2900 and the compute in memory multiplication of an input with one or more weight values at step 2910. With respect to step 2900, the weight values can be programmed in by a user or have been preprogrammed prior to the devices being provided to the user.

Beginning at step 2901, one or more multi-bit weight values for one or more layers of a neural network are received. For example, a host 120 can provide a set of weights previously determined in a training process for the network to a memory system's controller 102, from which they are provided to the memory dies of the memory system 100. At step 2903 one or more of the weight values are encoded as a corresponding one or more corresponding sets of weight level components each corresponding to one of a plurality of threshold voltage values, as described above with respect to FIGS. 16-21. Depending on the embodiment, the encoding can be performed on memory die/control die 500/611 by the system control logic 560/660, by the memory controller 102, or some combination of these. The sets of weight level components for one or more weights values are programmed into corresponding sets of memory cells at step 2905. The programming of memory cells to the threshold voltage values corresponding to the weight component levels can be performed in a conventional programming process for a NAND memory using the control circuitry of the system control logic 560/660, column control circuitry 510/610, and row control circuitry 520/620.

The receiving of one or more input values for the layer of neural network and the compute in memory multiplication is performed in 2910. At step 2911 a set of one or more multi-bit input values is received, where this can be the initial input for the first layer of the neural network or a subsequent layer. In the case of an initial input, this can be received from a host 120 at the memory controller 102, which then sends the input vector on to the appropriate memory die. For subsequent layers, the input can be the output of a preceding layer generated by a compute in memory operation, either on the same or a different memory die of the memory system. Step 2911 and the subsequent sub-steps of the compute in memory multiplication of step 2910 is for one or more weights of a single layer and for only a single word line of the NAND array in which the weight values were stored in step 2900. If the layer has weights stored on multiple word lines, these word lines can be read sequentially and the results accumulated to account for all of the weight values and input values of the layer.

At step 2913 the input values are encoded as sets of one or more input voltages, where each of the input voltages is one of a plurality of input voltage levels as described above with respect to FIGS. 22-27, and the input voltages of one or more sets of input voltages are applied to a corresponding one or more sets of bit lines at step 2915. Depending on the embodiment, the encoding of step 2913 can be performed on memory die/control die 500/611 by the system control logic 560/660, by the memory controller 102, or some combination of these. The input voltages can be applied by the column control circuitry and bit line drivers 2810 in the embodiment of FIG. 28, for example.

While biasing the bit lines as at step 2915, the read voltage is applied to the selected word line. The word line voltage can be applied by the word line drives and row control circuitry 2820 in the embodiment of FIG. 28, for example. In the example of the tables of FIGS. 19 and 21, the read voltage is VWL=3V. In a NAND memory structure, the other, non-selected word lines and select gates of the NAND strings will also be biased to be in an on state. The resultant current from the different NAND strings is accumulated on the source line and measured at step 2919 to provide the result of the compute in memory multiplication. For example, in the embodiment of FIG. 28 the sense amplifier or amplifiers 2850 can measure the resultant source line current and provide the output as an analog value or converted to a digital value. If the compute in memory operation for the layer involves additional multiplications, such as contributions from other word lines, these can be accumulated by the sensing circuitry or other control circuitry. At step 2921 the output can either be provided to the host 120, such for the final output of a neural network, or be used as the input for a subsequent layer whose weights are encoded in the memory cells on the same memory die or another memory die of the memory system.

According to a first set of aspects, a non-volatile memory device includes a control circuit configured to connect to a plurality non-volatile memory cells, each of the memory cells connected to a first word line and connected between a source line and one of one or more bit lines, a first set of a plurality of the non-volatile memory cells connected to a first of the bit lines and configured to store a multi-bit weight value for a layer of a neural network encoded as a first set of weight components programmed into the first set of memory cells, each of the first set of weight components including one of a plurality of threshold voltage values. The control circuit configured to: receive a first, multi-bit input value for the layer of the neural network; encode the first input value as a first set of one or more input voltages, each of the input voltages being one of a plurality of input voltage levels; apply a first of the first set of input voltages to the first bit line; concurrently with applying the first of the first set of input voltages to the first bit line, bias the first word line to a read voltage, the read voltage configured to bias memory cells programmed into at least a first of the plurality of threshold voltage levels to be in a linear region of operation; and measure a resultant current on the source line in response to concurrently biasing the first word line to the read voltage while applying the first of the first set of input voltages to the first bit line.

In additional aspects, a method includes receiving a multi-bit input value for a layer of a neural network and performing a compute in memory multiplication between the input value and a weight value for the layer of the neural network. The weight value is encoded as a first set of weight components programmed into a first set of memory cells, each of the first set of weight components including one of a plurality of threshold voltage values, the first set of memory cells being part of a plurality non-volatile memory cells connected to a first word line and connected between a source line and a first bit line. The compute in memory multiplication is performed by: encoding the input value as a first set of one or more input voltages, each of the input voltages being one of a plurality of input voltage levels; applying a first of the first set of input voltages to the first bit line; concurrently with applying the first of the first set of input voltages to the first bit line, biasing the first word line to a read voltage, the read voltage configured to bias memory cells programmed into at least a first of the plurality of threshold voltage levels to be in a linear region of operation; and determining the result of the in memory multiplication by measuring a resultant current on the source line in response to concurrently biasing the first word line to the read voltage while applying the first of the first set of input voltages to the first bit line.

In another set of aspects, a non-volatile memory device includes an array of non-volatile memory cells and one or more control circuits connected to the array of non-volatile memory cells. In the array of non-volatile memory cells, each of the non-volatile memory cells has a programmable threshold voltage, the array is formed over a substrate and has a three dimensional NAND architecture comprising a plurality of NAND strings, each of the NAND strings running perpendicularly to a surface of the substrate and comprising a plurality of memory cells connected in series between one of a plurality of bit lines and a source line, each of the memory cells connected to one of a plurality of word lines, the word lines, bit lines and source line running parallel to the surface of the substrate. The one or more control circuits are configured to: receive a multi-bit weight value for a layer of a neural network; encode the multi-bit weight value as a first set of weight components each including one of a plurality of threshold voltage values for the memory cells; program the first set of weight components into a first set of the memory cells connected to a first word line and a first bit line; subsequent to programming the first set of weight components, receive a multi-bit input value for the layer of the neural network; encode the input value as a first set of one or more input voltages, each of the input voltages being one of a plurality of input voltage levels; apply a first of the first set of input voltages to the first bit line; concurrently with applying the first of the first set of input voltages to the first bit line, bias the first word line to a read voltage, the read voltage configured to bias memory cells programmed into at least a first of the plurality of threshold voltage levels to be in a linear region of operation; and measure a resultant current on the source line in response to concurrently biasing the first word line to the read voltage while applying the first of the first set of input voltages to the first bit line.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory device, comprising:
a control circuit configured to connect to a plurality non-volatile memory cells that are part of an array of memory cells having a NAND architecture, each of the memory cells connected to a first word line and connected between a source line and one of one or more bit lines, a first set of a plurality of the non-volatile memory cells connected to a first of the bit lines and configured to store a multi-bit weight value for a layer of a neural network encoded as a first set of weight components programmed into the first set of memory cells, each of the first set of weight components including one of a plurality of threshold voltage values, the control circuit configured to:
 receive a first, multi-bit input value for the layer of the neural network;
 encode the first input value as a first set of one or more input voltages, each of the input voltages being one of a plurality of input voltage levels;
 apply a first of the first set of input voltages to the first bit line;
 concurrently with applying the first of the first set of input voltages to the first bit line, bias the first word line to a read voltage, the read voltage configured to bias memory cells programmed into at least a first of the plurality of threshold voltage levels to be in a linear region of operation in which the first word line voltage is greater than the first threshold voltage and a drain to source voltage is less that the first word line voltage minus the first threshold voltage; and
 measure a resultant current on the source line in response to concurrently biasing the first word line to the read voltage while applying the first of the first set of input voltages to the first bit line.

2. The non-volatile memory device of claim 1, wherein the control circuit is formed on a control die, the non-volatile memory device further comprising:
a memory die including the plurality of non-volatile memory cells, the memory die formed separately from and bonded to the control die.

3. The non-volatile memory device of claim 1, wherein one or more additional sets of a plurality of the non-volatile memory cells are each connected to a corresponding additional one of the bit lines and configured to store the multi-bit weight value for the layer of the neural network encoded as the first set of weight components programmed into each of the additional sets of memory cells, the control circuit further configured to:
 while concurrently biasing the first word line to the read voltage while applying the first of the first set of input voltages to the first bit line, apply, to each of the additional one or more of the bit lines, a corresponding one or more of the first set of input voltages, wherein the resultant current on the source line is further measured will concurrently applying the corresponding one or more of the first set of input voltages.

4. The non-volatile memory device of claim 1, wherein the plurality of threshold voltages further includes a second threshold voltage level and a third threshold voltage level, and wherein the read voltage is further configured to bias memory cells programmed into second threshold voltage level to be in an on state and to program the third threshold voltage into an off state.

5. The non-volatile memory device of claim 1, wherein the plurality of threshold voltages further includes a second threshold voltage level, and wherein the read voltage is further configured to bias memory cells programmed into second threshold voltage level to be in the linear region of operation.

6. The non-volatile memory device of claim 1, wherein one or more of the first set of weight components comprises a plurality of the threshold voltage values programmed into a corresponding plurality of the first set of memory cells.

7. The non-volatile memory device of claim 1, wherein the control circuit is further configured to:
 receive the multi-bit weight value for the layer of the neural network;
 encode the multi-bit weight value as the first set of weight components; and
 program the first set of weight components into the first set of memory cells.

8. The non-volatile memory device of claim 1, wherein each of the first set of non-volatile memory cells connected to the first bit line through a corresponding drain side select gate and to the source line though a corresponding source side select gate, the control circuit further configured to:
 concurrently with biasing the first word line to the read voltage, biasing the corresponding drain side select gates and the corresponding source side select gates to be in an on state.

9. The non-volatile memory device of claim 8, further comprising the array of non-volatile memory cells, where the array of non-volatile memory cells has a three dimensional NAND architecture formed over a substrate in which each of the plurality of memory cells are part of a corresponding NAND string running perpendicularly to the substrate and the one or more bit lines, the source line, and the first word line run parallel to the substrate.

10. The non-volatile memory device of claim 1, wherein the neural network is a generative pre-trained transformer (GPT).

11. A method, comprising:
receiving a multi-bit input value for a layer of a neural network; and
performing a compute in memory multiplication between the input value and a multi-bit weight value for the layer of the neural network, the weight value encoded as a first set of weight components programmed into a first set of memory cells of a plurality of memory cells, each of the first set of weight components including one of a plurality of threshold voltage values, the first set of memory cells being part of a plurality non-volatile memory cells that are part of an array of memory cells having a NAND architecture, each of the memory cells connected to a first word line and connected between a source line and a first bit line, the compute in memory multiplication is performed by:
 encoding the input value as a first set of one or more input voltages, each of the input voltages being one of a plurality of input voltage levels;
 applying a first of the first set of input voltages to the first bit line;
 concurrently with applying the first of the first set of input voltages to the first bit line, biasing the first word line to a read voltage, the read voltage configured to bias memory cells programmed into at least a first of the plurality of threshold voltage levels to be in a linear region of in which the first word line voltage is greater than the first threshold voltage and a drain to source voltage is less that the first word line voltage minus the first threshold voltage; and
 determining the result of the in memory multiplication by measuring a resultant current on the source line in response to concurrently biasing the first word line to the read voltage while applying the first of the first set of input voltages to the first bit line.

12. The method of claim 11, further comprising:
receiving the multi-bit weight value for the layer of the neural network;
encoding the multi-bit weight value as the first set of weight components; and
programming the first set of weight components into the first set of memory cells.

13. The method of claim 11, wherein one or more additional sets of the plurality of memory cells are each connected to a corresponding additional one of the bit lines and store the multi-bit weight value for the layer of the neural network encoded as the first set of weight components programmed into the set of memory cells, the method further comprising:
while concurrently biasing the first word line to the read voltage while applying the first of the first set of input voltages to the first bit line, applying, to each of the additional one or more of the bit lines, a corresponding one or more of the first set of input voltages, wherein the resultant current on the source line is further measured will concurrently applying the corresponding one or more of the first set of input voltages.

14. The method of claim 11, wherein the plurality of threshold voltages further includes a second threshold voltage level and a third threshold voltage level, and wherein the read voltage is further configured to bias memory cells programmed into second threshold voltage level to be in an on state and to program the second threshold voltage into an off state.

15. The method of claim 11, wherein the plurality of threshold voltages further includes a second threshold voltage level, and wherein the read voltage is further configured to bias memory cells programmed into second threshold voltage level to be in the linear region of operation.

16. The method of claim 11, wherein one or more of the first set of weight components comprises a plurality of the threshold voltage values programmed into a corresponding plurality of the first set of memory cells.

17. A non-volatile memory device, comprising:
an array of non-volatile memory cells each having a programmable threshold voltage, the array formed over a substrate and having a three dimensional NAND architecture comprising a plurality of NAND strings, each of the NAND strings running perpendicularly to a surface of the substrate and comprising a plurality of memory cells connected in series between one of a plurality of bit lines and a source line, each of the memory cells connected to one of a plurality of word lines, the word lines, bit lines and source line running parallel to the surface of the substrate; and
one or more control circuits connected to the array of non-volatile memory cells and configured to:
  receive a multi-bit weight value for a layer of a neural network;
  encode the multi-bit weight value as a first set of weight components each including one of a plurality of threshold voltage values for the memory cells;
  program the first set of weight components into a first set of the memory cells connected to a first word line and a first bit line;
  subsequent to programming the first set of weight components, receive a multi-bit input value for the layer of the neural network;
  encode the input value as a first set of one or more input voltages, each of the input voltages being one of a plurality of input voltage levels;
  apply a first of the first set of input voltages to the first bit line;
  concurrently with applying the first of the first set of input voltages to the first bit line, bias the first word line to a read voltage, the read voltage configured to bias memory cells programmed into at least a first of the plurality of threshold voltage levels to be in a linear region of operation in which the first word line voltage is greater than the first threshold voltage and a drain to source voltage is less that the first word line voltage minus the first threshold voltage; and
  measure a resultant current on the source line in response to concurrently biasing the first word line to the read voltage while applying the first of the first set of input voltages to the first bit line.

18. The non-volatile memory device of claim 17, wherein the array of non-volatile memory cells is part of a memory die and the one or more control circuits are part of a control die, the memory die formed separately from and bonded to the control die.

19. The non-volatile memory device of claim 17, wherein one or more of the first set of weight components comprises a plurality of the threshold voltage values programmed into a corresponding plurality of the first set of memory cells.

20. The non-volatile memory device of claim 17, wherein one or more additional sets of a plurality of the non-volatile memory cells are each connected to a corresponding additional one of the bit lines and configured to store the multi-bit weight value for the layer of the neural network encoded as the first set of weight components programmed into each of the additional sets of memory cells, the control circuit further configured to:
  while concurrently biasing the first word line to the read voltage while applying the first of the first set of input voltages to the first bit line, apply, to each of the additional one or more of the bit lines, a corresponding one or more of the first set of input voltages, wherein the resultant current on the source line is further measured will concurrently applying the corresponding one or more of the first set of input voltages.

* * * * *